United States Patent
Mori et al.

(10) Patent No.: US 11,492,551 B2
(45) Date of Patent: Nov. 8, 2022

(54) LIQUID CRYSTAL COMPOSITION USED IN ELEMENT FOR PHASE CONTROL OF ELECTROMAGNETIC WAVE SIGNAL

(71) Applicants: JNC CORPORATION, Tokyo (JP); JNC PETROCHEMICAL CORPORATION, Tokyo (JP)

(72) Inventors: Takanori Mori, Chiba (JP); Yoichi Uriu, Chiba (JP); Eiji Okabe, Chiba (JP); Hitoshi Tobata, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/468,712

(22) Filed: Sep. 8, 2021

(65) Prior Publication Data

US 2022/0081618 A1 Mar. 17, 2022

(30) Foreign Application Priority Data

Sep. 15, 2020 (JP) .............................. JP2020-154402

(51) Int. Cl.
| | | |
|---|---|---|
| G02F 1/1333 | (2006.01) | |
| C09K 19/34 | (2006.01) | |
| C09K 19/20 | (2006.01) | |
| C09K 19/18 | (2006.01) | |
| C09K 19/04 | (2006.01) | |

(52) U.S. Cl.
CPC .......... *C09K 19/3491* (2013.01); *C09K 19/18* (2013.01); *C09K 19/20* (2013.01); *C09K 19/3402* (2013.01); *C09K 2019/0466* (2013.01); *C09K 2019/181* (2013.01); *C09K 2019/183* (2013.01); *C09K 2019/186* (2013.01); *C09K 2019/188* (2013.01); *C09K 2019/3422* (2013.01)

(58) Field of Classification Search
CPC .... C09K 19/3491; C09K 19/18; C09K 19/20; C09K 19/3402; C09K 19/3059; C09K 2019/0466; C09K 2019/181; C09K 2019/183; C09K 2019/186; C09K 2019/188; C09K 2019/3422; C09K 2019/3063; C09K 2019/0444; G02F 1/1333

See application file for complete search history.

(56) References Cited

U.S. PATENT DOCUMENTS

| | | | | |
|---|---|---|---|---|
| 6,017,467 A | * | 1/2000 | Fujita ................... | C07D 319/06 252/299.61 |
| 6,444,279 B1 | * | 9/2002 | Reiffenrath .......... | C07D 239/26 544/242 |
| 2012/0205583 A1 | | 8/2012 | Montenegro et al. | |
| 2020/0190404 A1 | * | 6/2020 | Okabe ................. | C09K 19/542 |
| 2020/0328528 A1 | | 10/2020 | Misaki et al. | |
| 2022/0081618 A1 | * | 3/2022 | Mori .................. | C09K 19/3491 |

FOREIGN PATENT DOCUMENTS

| | | |
|---|---|---|
| JP | 2004285085 | 10/2004 |
| JP | 2011074074 | 4/2011 |
| WO | 2017201515 | 11/2017 |
| WO | 2017208996 | 12/2017 |

OTHER PUBLICATIONS

Hiroshi Moritake, "Microwave / millimeter wave phase control device (1st) Microwave characteristics of liquid crystal display," EKISHO, vol. 23, Jan. 2019, with partial English translation thereof, pp. 1-7.

Yoshio Inuishi, "Dielectric Phenomenon Theory," Institute of Electrical Engineers of Japan, Ohmsha, Ltd., Jul. 1973, with partial English translation thereof, pp. 1-9.

* cited by examiner

*Primary Examiner* — Geraldina Visconti
(74) *Attorney, Agent, or Firm* — JCIPRNET

(57) ABSTRACT

As a material used in an element used for phase control of an electromagnetic wave signal having a frequency of 1 GHz to 10 THz, a liquid crystal composition is required, which has a high upper limit temperature of a nematic phase, a low lower limit temperature of a nematic phase, large dielectric anisotropy and a small tan δ in a frequency region where the phase control of an electromagnetic wave signal is performed, and stability against heat, and which has an excellent balance of the characteristics. A liquid crystal composition which is used in an element for phase control of an electromagnetic wave signal having any frequency from 1 GHz to 10 THz, the liquid crystal composition containing at least one compound selected from compounds represented by Formula (1) as a first component.

(1)

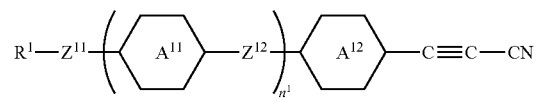

13 Claims, No Drawings

LIQUID CRYSTAL COMPOSITION USED IN ELEMENT FOR PHASE CONTROL OF ELECTROMAGNETIC WAVE SIGNAL

CROSS REFERENCE TO RELATED APPLICATIONS

This application claims the priority benefit of Japan application serial no. 2020-154402, filed on Sep. 15, 2020. The entirety of the above-mentioned patent application is hereby incorporated by reference herein and made a part of this specification.

BACKGROUND

Technical Field

The disclosure relates to an element used for phase control of an electromagnetic wave signal having a frequency of 1 GHz to 10 THz and a liquid crystal composition used in this element. The composition has a nematic phase and positive dielectric anisotropy.

Related Art

As a novel use of a liquid crystal composition that is often used for display applications, applications to a high-frequency technology such as an antenna that transmits and receives an electromagnetic wave using a liquid crystal composition attract attention.

Specifically, elements used for phase control of an electromagnetic wave signal having a frequency of 1 GHz to 10 THz may be a millimeter-wave band or microwave band antenna, an infrared laser element, and the like. Regarding these elements, various methods have been studied, and a method using a liquid crystal composition, which is considered to have few failures because there is no mechanical movable portion, attracts attention.

The liquid crystal composition having dielectric anisotropy has different dielectric constants in a vertical direction and a horizontal direction with respect to an orientation direction of the liquid crystal composition at a frequency (from about several hundred kilohertz to several hundred megahertz or less) lower than a frequency (a relaxation frequency) at which orientation polarization is relaxed. Even at a frequency higher than the relaxation frequency, that is, in a range of microwave to terahertz wave (to 10 THz), the values become smaller, but the difference in the dielectric constants in the vertical direction and the horizontal direction with respect to the orientation direction of the liquid crystal composition is observed, and the dielectric anisotropy is present. The value of the difference is substantially constant in the range of microwave to terahertz wave (to 10 THz) (Non-patent literature 1). Therefore, the liquid crystal composition can change the dielectric constant in one direction by changing the orientation direction of a molecule according to an external field (an electric field).

By utilizing this property, in the liquid crystal composition, the orientation of the molecules is changed according to an electric field from the outside, and the dielectric constant can be changed. For example, a microwave device which can electrically control the transmission characteristic of a high-frequency transmission line from the outside can be realized. Regarding this device, a voltage-controlled millimeter-wave band variable phase shifter in which a nematic liquid crystal composition is filled in a waveguide, a wideband variable phase shifter of a microwave/millimeter-wave band using a nematic liquid crystal composition to make a dielectric substrate of a microstrip line, and other devices are reported (Patent literatures 1 and 2).

In addition, in recent years, regarding electromagnetic waves including light, research of a metamaterial technology which exhibits behaviors not found in substances in the natural world is progressing. According to the characteristic thereof, the metamaterial technology is applied to technical fields such as high-frequency devices, microwave devices, antennas or the like, and various electromagnetic wave control elements are devised. As a capacitance control material of a transmission line using a metamaterial, as in the case of phase control, the use of a liquid crystal composition which is capable of changing the dielectric constant by changing the orientation of the molecules according to the electric field from the outside is also considered.

The element used for the phase control of an electromagnetic wave signal is desired to have characteristics such as high gain, low loss, and the like. Considering the phase control of a high frequency signal, in the characteristics required for the liquid crystal composition, large dielectric anisotropy that enables wide phase control and a small dielectric loss tangent (tan δ) proportional to absorption energy of an electromagnetic wave signal of the liquid crystal composition in the frequency region used for the phase control are required (Non-patent literature 1).

Because the liquid crystal composition is a dielectric, polarization (dielectric polarization) occurs with respect to an external field (an electric field). The dielectric constant is a physical quantity that indicates the response of the dielectric to the electric field, and the magnitude of the dielectric constant is related to the dielectric polarization. The mechanism by which the dielectric polarization occurs is broadly divided into three types, namely electronic polarization, ionic polarization, and orientation polarization. The orientation polarization is polarization associated with the orientation of the dipole moment, and as described above, at a frequency of about several hundred kilohertz to several hundred megahertz, the orientation polarization is relaxed, and the orientation polarization becomes smaller. As a result, only the electronic polarization and the ionic polarization are involved in the dielectric polarization at a high frequency (in a range of microwave to terahertz wave (to 10 THz)). Additionally, in a dielectric without loss, the dielectric constant ($\varepsilon$) and the refractive index (n) have a relationship of $\varepsilon = n^2$, and if the ionic polarization of the liquid crystal composition is considered to be small, it is considered that the larger the refractive index anisotropy ($\Delta n$) in visible light caused by the electronic polarization, the larger the dielectric anisotropy ($\Delta \varepsilon$) in a high frequency region (Non-patent literature 2). Therefore, it is preferable that the liquid crystal composition has large refractive index anisotropy.

In addition, in order to realize a switching characteristic and high energy efficiency of the element, it is desirable that the drive voltage is low. Therefore, the liquid crystal composition preferably has large dielectric anisotropy even at a low frequency (a frequency lower than the relaxation frequency).

In addition, the element used for the phase control of an electromagnetic wave signal is required to have a wide usable temperature range and a short response time of the element, and as the characteristics of the liquid crystal composition, a high upper limit temperature of a nematic phase, a lower limit temperature of a nematic phase, stability against heat, low viscosity and the like are also required.

Conventional liquid crystal compositions used in the element are disclosed in Patent literatures 3 and 4 below.

LITERATURE OF RELATED ART

Patent Literature

[Patent literature 1] International Publication No. WO 2017/201515
[Patent literature 2] International Publication No. WO 2017/208996
[Patent literature 3] Japanese Patent Laid-Open No. 2004-285085
[Patent literature 4] Japanese Patent Laid-Open No. 2011-74074

Non-Patent Literature

[Non-patent literature 1] EKISHO, Vol. 1 23 (No. 1), (2019), pages 51-55
[Non-patent literature 2] Dielectric Phenomenon Theory, Institute of Electrical Engineers of Japan, Ohmsha, Ltd., Jul. 25, 1973, pages 92-95

SUMMARY

As a material for the element used for phase control of an electromagnetic wave signal, a liquid crystal composition is required to have a high upper limit temperature of a nematic phase and a low lower limit temperature of a nematic phase, have large dielectric anisotropy (large refractive index anisotropy) and a small tan δ in a frequency region where the phase control of an electromagnetic wave signal is performed, and large dielectric anisotropy at a low frequency for reducing a drive voltage, and further preferably, have small viscosity, a large specific resistance at a drive frequency range and stability against heat.

However, as this liquid crystal composition for use in an element used for phase control of an electromagnetic wave signal, the conventional liquid crystal composition used for the display use and the like is insufficient in terms of characteristics. These characteristics are characteristics such as high loss and/or insufficient phase shift and the like, which are insufficient to the use for phase control of a high frequency signal.

The development of a liquid crystal material used for an element for phase control of an electromagnetic signal is still in progress, and in order to improve the characteristics of high frequency control, attempts for developing such novel compound that enables optimization of the element are constantly being made. Besides, in order to use the liquid crystal material as a material for the element used for the electromagnetic wave control, a unique liquid crystal medium is required.

The disclosure provides a liquid crystal composition which has good required characteristics shown above and an excellent balance of the characteristics as a material for the element used for the phase control of an electromagnetic wave signal having a frequency of 1 GHz to 10 THz.

As a result of diligent studies, the inventors found that a liquid crystal composition containing a liquid crystalline compound having a specific structure solves the above-described problems, and completed the disclosure. That is, the disclosure provides a liquid crystal composition which is used in an element for phase control of an electromagnetic wave signal having any frequency from 1 GHz to 10 THz, the liquid crystal composition containing at least one compound selected from compounds represented by Formula (1) as a first component.

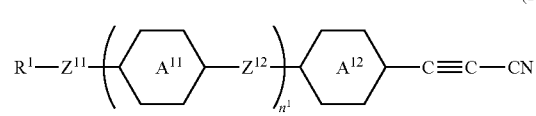

(1)

In Formula (1),
$R^1$ is alkyl having 1 to 12 carbon atoms, alkoxy having 1 to 12 carbon atoms, alkenyl having 2 to 12 carbon atoms, or alkenyloxy having 2 to 12 carbon atoms, non-adjacent —$CH_2$— in $R^1$ may be replaced by —S—, and hydrogen may be replaced by fluorine,
ring $A^{11}$ is a group selected from a group consisting of Groups (A) and (B),

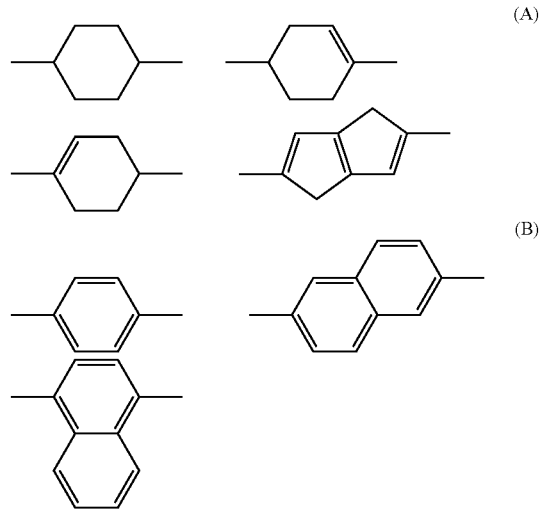

in groups of Group (A), non-adjacent —$CH_2$— may be replaced by —O— or —S—, and in groups of Group (B), at least one —CH= may be replaced by —N=,
in groups of Groups (A) and (B), at least one hydrogen may be replaced by cyano, fluorine, alkyl having 1 to 5 carbon atoms, or cycloalkyl having 3 to 6 carbon atoms,
ring $A^{12}$ is 1,4-phenylene, and at least one hydrogen may be replaced by cyano, fluorine, alkyl having 1 to 5 carbon atoms, or cycloalkyl having 3 to 6 carbon atoms, $Z^{11}$ is a single bond, —CH=CH—, or —C≡C—, $Z^{12}$ is a single bond, —$CH_2CH_2$—, —CH=CH—, or —C≡C—, one of $Z^{12}$ is —$CH_2CH_2$—, —CH=CH—, or —C≡C—, and multiple $Z^{12}$ may all be single bonds when hydrogen of $R^1$ is replaced by fluorine, when $Z^{11}$ is —C≡C—, or when at least one hydrogen in the ring $A^{11}$ is replaced by cyano, alkyl having 1 to 5 carbon atoms, or cycloalkyl having 3 to 6 carbon atoms, and
$n^1$ is 1, 2, or 3.

According to the disclosure, a liquid crystal composition can be provided, which has a high upper limit temperature of a nematic phase and a low lower limit temperature of a nematic phase, and also has large dielectric anisotropy and a small tan δ in a frequency region where the phase control of an electromagnetic wave signal is performed, and large dielectric anisotropy at a low frequency for reducing a drive voltage, and further (preferably) has small viscosity, a large specific resistance in a drive frequency range, and stability against heat. The element using the liquid crystal composition of the disclosure can exhibit excellent characteristics capable of performing phase control of an electromagnetic wave signal in a wide temperature range.

DESCRIPTION OF THE EMBODIMENTS

The usage of terms in this specification is as follows. The term "liquid crystal composition" may be abbreviated as "composition", and the term "electromagnetic wave control element" may be abbreviated as "element". An "electromagnetic wave signal phase control element" is a general term of an electromagnetic wave signal phase control panel and an electromagnetic wave signal phase control module. A "liquid crystalline compound" is a general term of compounds that have a liquid crystal phase such as a nematic phase or a smectic phase and compounds that do not have a liquid crystal phase but are mixed into the composition for the purpose of adjusting characteristics such as a temperature range of the nematic phase, viscosity, and dielectric anisotropy. This compound has a six-membered ring such as 1,4-cyclohexylene and 1,4-phenylene, and a molecule (a liquid crystal molecule) of the compound is rod-like. A "polymerizable compound" is a compound added for the purpose of generating a polymer in the composition. In that sense, the liquid crystalline compound having alkenyl is not classified into the polymerizable compound.

The liquid crystal composition is prepared by mixing a plurality of liquid crystalline compounds. Additives such as optically active compounds and polymerizable compounds are added to the liquid crystal composition as needed.

In the specification, a proportion of the liquid crystalline compound is indicated by a mass percentage (% by mass) based on the mass of the liquid crystal composition containing no additive even when an additive is added. A proportion of the additive is indicated by a mass percentage (% by mass) based on the mass of the liquid crystal composition containing no additive. That is, the proportions of the liquid crystalline compound and the additive are calculated based on the total mass of the liquid crystalline compound.

An "upper limit temperature of a nematic phase" may be abbreviated as an "upper limit temperature". A "lower limit temperature of a nematic phase" may be abbreviated as a "lower limit temperature". The expression "increase the dielectric anisotropy" means that the value of the dielectric anisotropy increases positively when the composition has positive dielectric anisotropy, and means that the value of the dielectric anisotropy increases negatively when the composition has negative dielectric anisotropy.

diagonal line across one side of the ring β indicates that any hydrogen on the ring β may be replaced by a substituent (—Sp-P). The subscript 'y' indicates the number of the replaced substituents. When the subscript 'y' is 0, the replacement does not occur. When the subscript 'y' is 2 or more, a plurality of substituents (—Sp-P) are present on the ring β. In this case, the rule "may be the same or different" also applies. Moreover, this rule also applies to the case in which the Ra symbol is used in a plurality of compounds.

In Formula (1z), for example, the expression such as "Ra and Rb are alkyl, alkoxy, or alkenyl" means that Ra and Rb are independently selected from a group of alkyl, alkoxy, and alkenyl. Here, a group represented by Ra and a group represented by Rb may be the same or different. This rule also applies to the case in which the Ra symbol is used in a plurality of compounds. This rule also applies to the case in which a plurality of Ras are used in one compound.

At least one compound selected from compounds represented by Formula (1z) may be abbreviated as "Compound (1z)". The "Compound (1z)" means one compound represented by Formula (1z), a mixture of two compounds, or a mixture of three or more compounds. The same also applies to the compounds represented by other formulas. The expression "at least one compound selected from compounds represented by Formulas (1z) and (2z)" means at least one compound selected from a group of Compounds (1z) and (2z).

The expression "at least one 'A'" means that the number of 'A' is arbitrary. The expression "at least one 'A' may be replaced by 'B'" means that when the number of 'A' is one, the position of 'A' is arbitrary, and when the number of 'A' is two or more, positions of 'A' can also be selected without limitation. The expression "at least one —CH$_2$— may be replaced by —O—" may be used. In this case, —CH$_2$—CH$_2$—CH$_2$— may be converted to —O—CH$_2$—O— by replacing non-adjacent —CH$_2$— with —O—. However, the adjacent —CH$_2$— is not replaced by —O—, because —O—O—CH$_2$— (peroxide) is generated in this replacement.

The alkyl of the liquid crystalline compound is a straight chain or a branched chain and does not contain cyclic alkyl. The straight-chain alkyl is preferable to the branched-chain alkyl. The same also applies to terminal groups such as alkoxy and alkenyl. Regarding a stereo configuration related to 1,4-cyclohexylene, a trans configuration is preferable to a cis configuration to increase the upper limit temperature. Because 2-fluoro-1,4-phenylene is laterally asymmetrical, left-facing (L) configurations and right-facing (R) configurations are present.

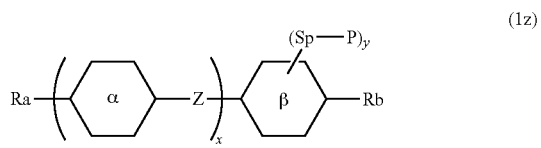

(1z)

The above Compound (1z) is described as an example. In Formula (1z), symbols α and β enclosed in hexagons respectively correspond to a ring α and a ring β, and represent rings such as a six-membered ring and a condensed ring. When the subscript 'x' is 2, two rings a are present. The two groups represented by the two rings a may be the same or different. This rule applies to any two rings a when the subscript 'x' is greater than 2. This rule also applies to other symbols such as a bonding group Z. A

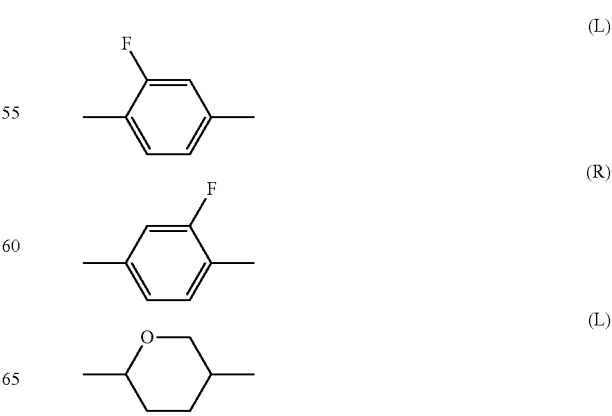

-continued

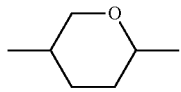
(R)

The same also applies to divalent groups such as tetrahydropyran-2,5-diyl. Additionally, preferable tetrahydropyran-2,5-diyl is right-facing (R) to increase the upper limit temperature. The same also applies to binding groups (—COO— or —OCO—) such as carbonyloxy.

The disclosure includes the following items and the like.

Item 1. A liquid crystal composition which is used in an element for phase control of an electromagnetic wave signal having any frequency from 1 GHz to 10 THz, the liquid crystal composition containing at least one compound selected from compounds represented by Formula (1) as a first component.

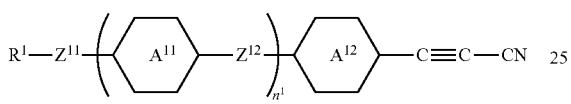
(1)

In Formula (1),
$R^1$ is alkyl having 1 to 12 carbon atoms, alkoxy having 1 to 12 carbon atoms, alkenyl having 2 to 12 carbon atoms, or alkenyloxy having 2 to 12 carbon atoms, non-adjacent —CH$_2$— in $R^1$ may be replaced by —S—, and hydrogen may be replaced by fluorine,
ring $A^{11}$ is a group selected from a group consisting of Groups (A) and (B),

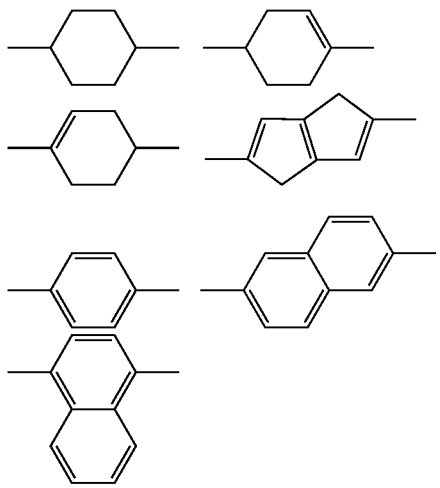

in groups of Group (A), non-adjacent —CH$_2$— may be replaced by —O— or —S—, in groups of Group (B), at least one —CH= may be replaced by —N=, and in groups of Groups (A) and (B), at least one hydrogen may be replaced by cyano, fluorine, alkyl having 1 to 5 carbon atoms, or cycloalkyl having 3 to 6 carbon atoms,
ring $A^{12}$ is 1,4-phenylene, and at least one hydrogen may be replaced by cyano, fluorine, alkyl having 1 to 5 carbon atoms, or cycloalkyl having 3 to 6 carbon atoms; $Z^{11}$ is a single bond, —CH=CH—, or —C≡C—; $Z^{12}$ is a single bond, —CH$_2$CH$_2$—, —CH=CH—, or —C≡C—, one of $Z^{12}$ is —CH$_2$CH$_2$—, —CH=CH—, or —C≡C—, and multiple $Z^{12}$ may all be single bonds when hydrogen of $R^1$ is replaced by fluorine, when $Z^{11}$ is —C≡C—, or when at least one hydrogen in the ring $A^{11}$ is replaced by cyano, alkyl having 1 to 5 carbon atoms, or cycloalkyl having 3 to 6 carbon atoms, and
$n^1$ is 1, 2, or 3.

Item 2. The liquid crystal composition according to Item 1, containing at least one compound selected from compounds represented by Formulas (1-1) to (1-9) as the first component.

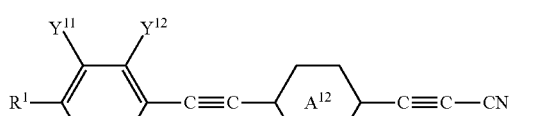
(1-1)

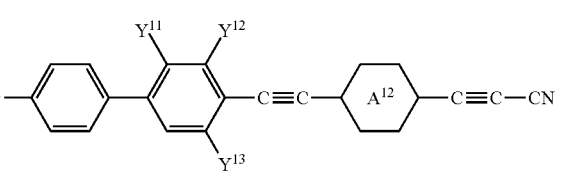
(1-2)

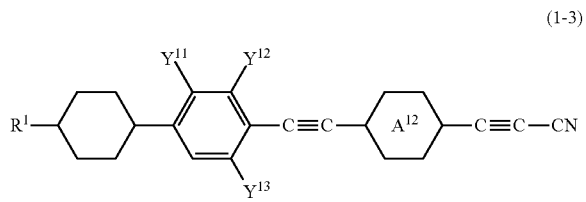
(1-3)

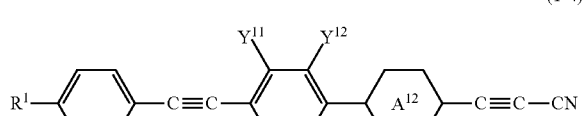
(1-4)

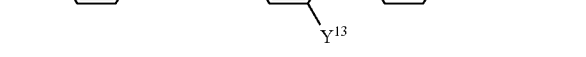
(1-5)

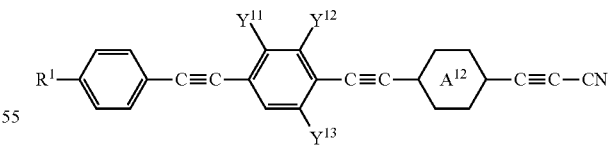

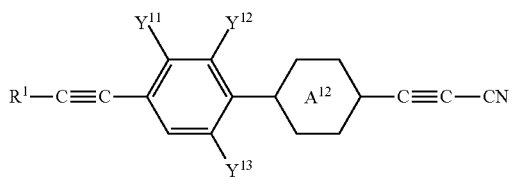
(1-6)

-continued

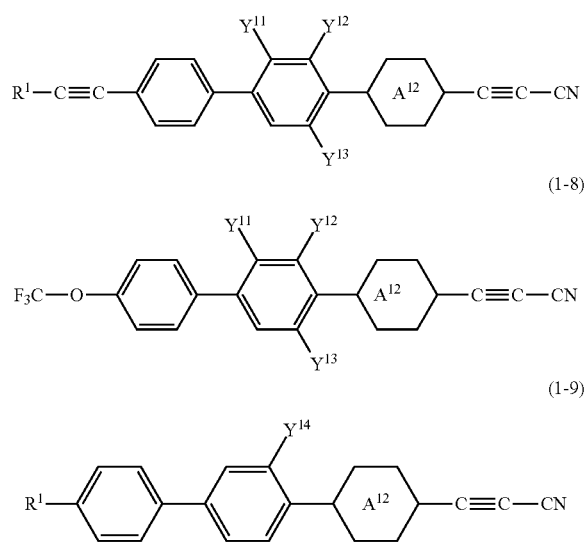

(1-7)

(1-8)

(1-9)

In these formulas, $R^1$ is alkyl having 1 to 12 carbon atoms, alkoxy having 1 to 12 carbon atoms, alkenyl having 2 to 12 carbon atoms, or alkenyloxy having 2 to 12 carbon atoms, $Y^{11}$, $Y^{12}$, and $Y^{13}$ are hydrogen, fluorine, methyl, ethyl, or cycloalkyl having 3 to 6 carbon atoms, $Y^{14}$ is methyl, ethyl, or cycloalkyl having 3 to 6 carbon atoms, and ring $A^{12}$ is 1,4-phenylene, and at least one hydrogen may be replaced by fluorine or alkyl having 1 to 5 carbon atoms.

Item 3. The liquid crystal composition according to Item 1 or 2, wherein a proportion of the first component is in a range of 5% by mass to 60% by mass based on a mass of the liquid crystal composition.

Item 4. The liquid crystal composition according to any one of Items 1 to 3, further containing at least one compound selected from compounds represented by Formula (2) as a second component.

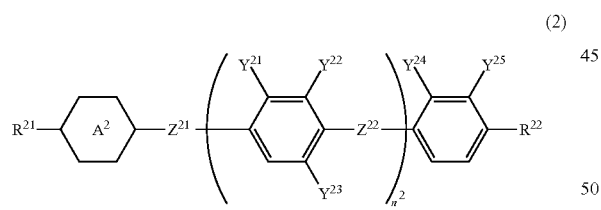

(2)

In Formula (2), $R^{21}$ and $R^{22}$ are alkyl having 1 to 12 carbon atoms, alkoxy having 1 to 12 carbon atoms, or alkenyl having 2 to 12 carbon atoms, and non-adjacent —CH$_2$— in $R^{21}$ and $R^{22}$ may be replaced by —O—, —CO—, —COO—, —CH=CH—, —C≡C—, or —S—, but O atoms are not directly bonded to each other;

ring $A^2$ is 1,4-cyclohexylene, 1,4-phenylene, 2-fluoro-1,4-phenylene, 2,5-difluoro-1,4-phenylene, 2,6-difluoro-1,4-phenylene, 2,6-benzothiophene, or 7-fluoro-2,6-benzothiophene; $Z^{21}$ and $Z^{22}$ are single bonds, —CH$_2$CH$_2$—, —CH=CH—, —C≡C—, —COO—, or —C≡C—C≡C—; $Y^{21}$ and $Y^{22}$ are hydrogen, fluorine, alkyl having 1 to 5 carbon atoms, or cycloalkyl having 3 to 6 carbon atoms, $Y^{23}$, $Y^{24}$ and $Y^{25}$ are hydrogen or fluorine, but $Y^{24}$ and $Y^{25}$ are not fluorine at the same time; and $n^2$ is 0, 1, or 2.

Item 5. The liquid crystal composition according to Item 4, containing at least one compound selected from a group of compounds represented by Formulas (2-1) to (2-21) as the second component.

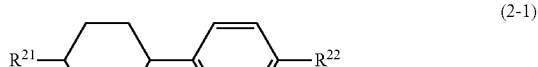

(2-1)

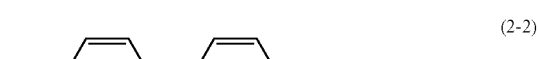

(2-2)

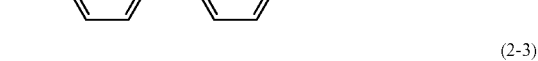

(2-3)

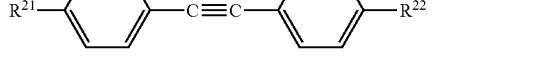

(2-4)

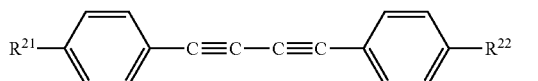

(2-5)

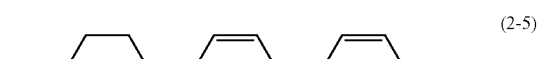

(2-6)

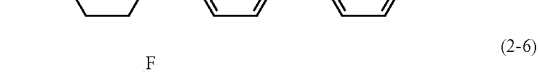

(2-7)

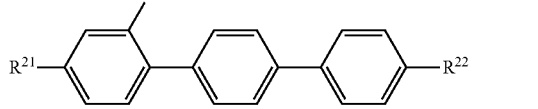

(2-8)

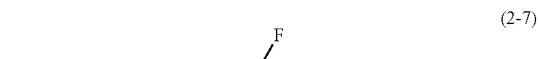

(2-9)

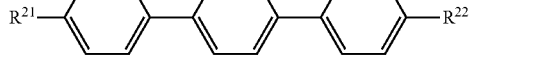

(2-10)

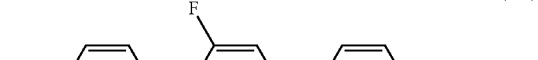

(2-11)

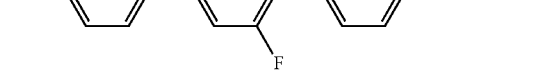
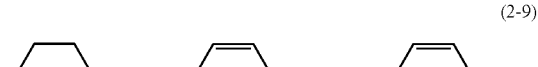
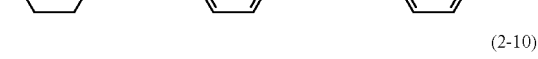
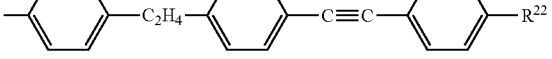
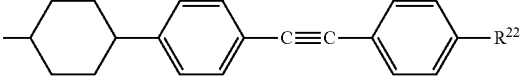

-continued (2-12)
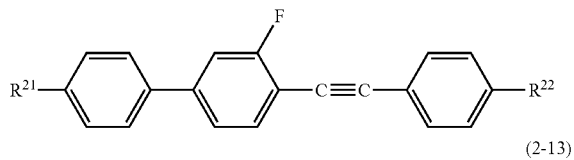

(2-13)
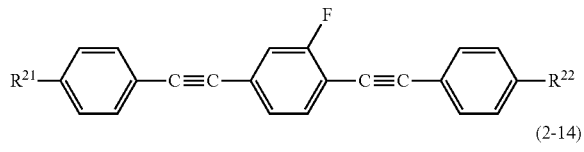

(2-14)
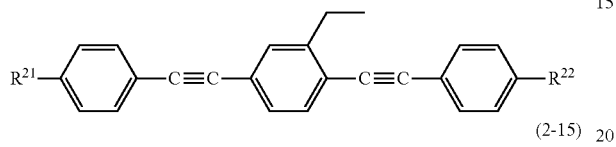

(2-15)
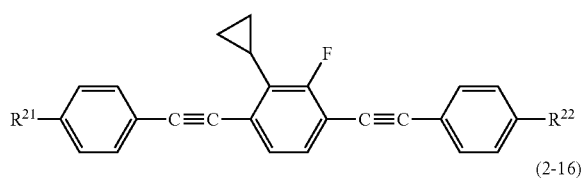

(2-16)
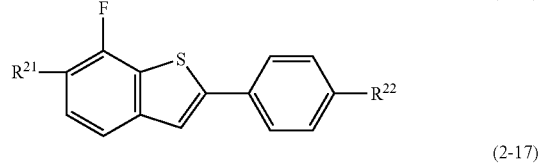

(2-17)
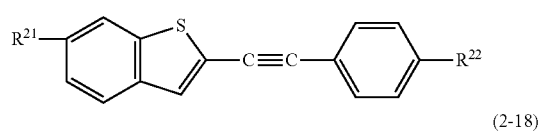

(2-18)
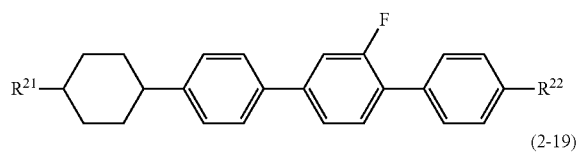

(2-19)
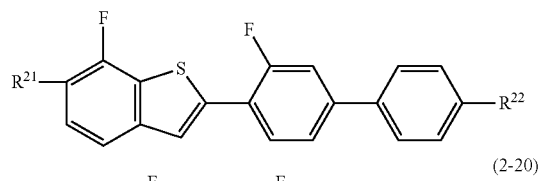

(2-20)
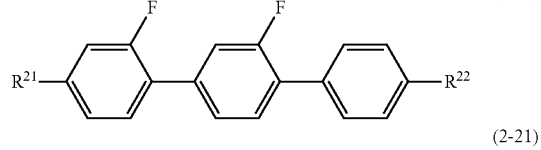

(2-21)
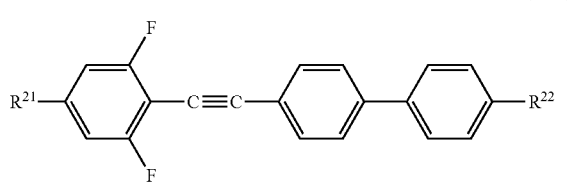

In these formulas, $R^{21}$ and $R^{22}$ are alkyl having 1 to 12 carbon atoms, alkoxy having 1 to 12 carbon atoms, or alkenyl having 2 to 12 carbon atoms, and non-adjacent —$CH_2$— in $R^{21}$ and $R^{22}$ may be replaced by —O—, —CO—, —COO—, —CH=CH—, or —C≡C—, but O atoms are not directly bonded to each other.

Item 6. The liquid crystal composition according to Item 4 or 5, wherein a proportion of the second component is in a range of 40% by mass to 90% by mass.

Item 7. The liquid crystal composition according to any one of Items 1 to 6, containing at least one compound selected from compounds represented by Formula (3) as a third component.

(3)
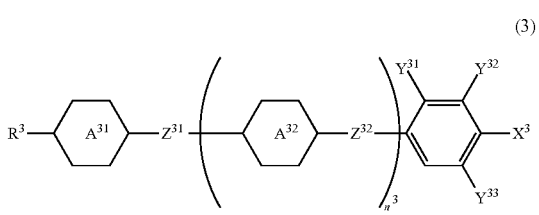

In Formula (3),
$R^3$ is alkyl having 1 to 12 carbon atoms, alkoxy having 1 to 12 carbon atoms, or alkenyl having 2 to 12 carbon atoms, and non-adjacent —$CH_2$— in $R^3$ may be replaced by —O—, —CO—, —COO—, —CH=CH—, —C≡C—, or —S—, but O atoms are not directly bonded to each other, and hydrogen may be replaced by fluorine;

ring $A^{31}$ is 1,4-cyclohexylene, 1,4-phenylene, 2-fluoro-1,4-phenylene, 2,5-difluoro-1,4-phenylene, 2,6-difluoro-1,4-phenylene, pyridine-2,5-diyl, pyrimidine-2,5-diyl, 1,3-dioxane-2,5-diyl, or tetrahydropyran-2,5-diyl;

ring $A^{32}$ is 1,4-phenylene, 2-fluoro-1,4-phenylene, 2,5-difluoro-1,4-phenylene, 2,6-difluoro-1,4-phenylene, pyridine-2,5-diyl, or pyrimidine-2,5-diyl;

$Z^{31}$ and $Z^{32}$ are single bonds, —$CH_2CH_2$—, —CH=CH—, —C≡C—, —COO—, or —$CF_2O$—; $X^3$ is —F, —Cl, —$CF_3$, —$OCF_3$, —C≡C—$CF_3$, —C≡C—$OCF_3$, —CN, or —NCS; $Y^{31}$, $Y^{32}$, and $Y^{33}$ are hydrogen or fluorine, but $Y^{31}$ and $Y^{32}$ are not fluorine at the same time; and $n^3$ is 1, 2, or 3.

Item 8. The liquid crystal composition according to Item 7, containing at least one compound selected from a group of compounds represented by Formulas (3-1) to (3-28) as the third component.

(3-1)
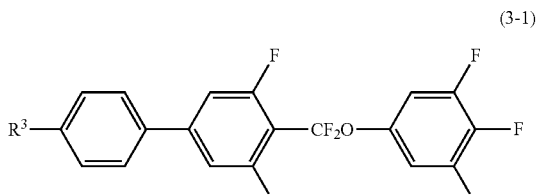

(3-2)
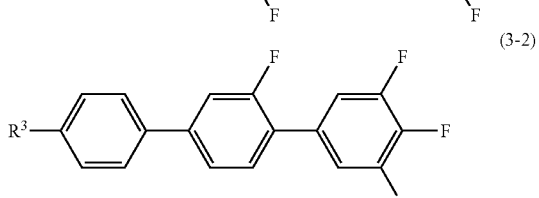

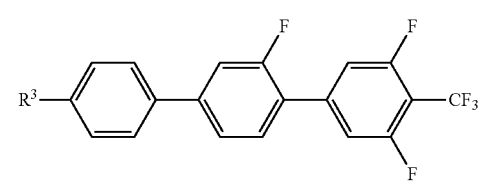 (3-3)
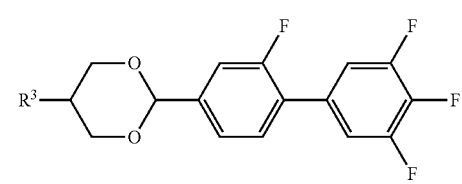 (3-4)
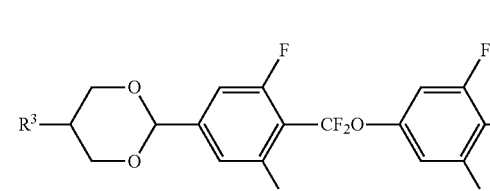 (3-5)
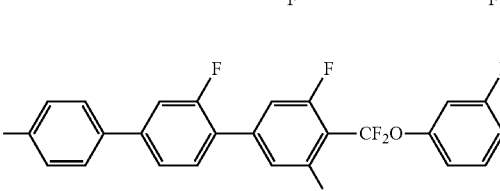 (3-6)
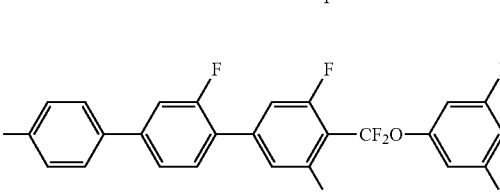 (3-7)
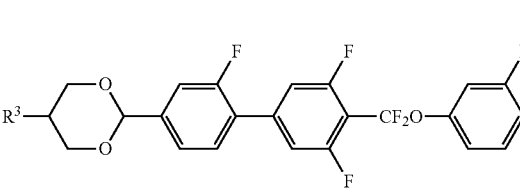 (3-8)
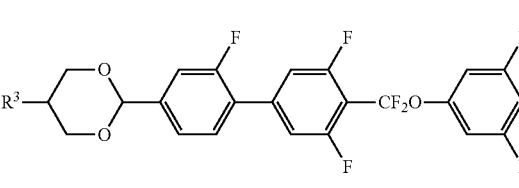 (3-9)
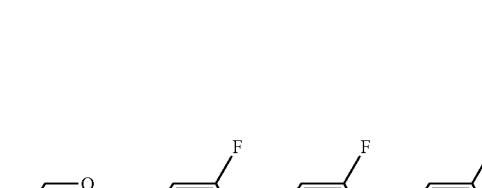 (3-10)
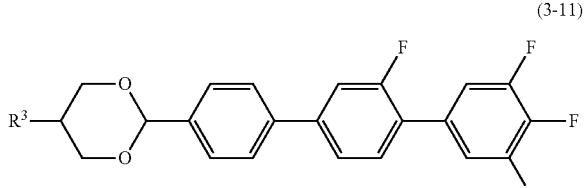 (3-11)
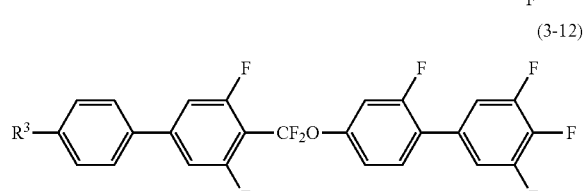 (3-12)
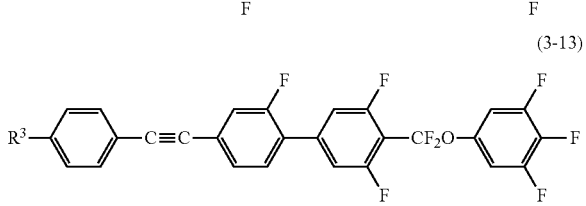 (3-13)
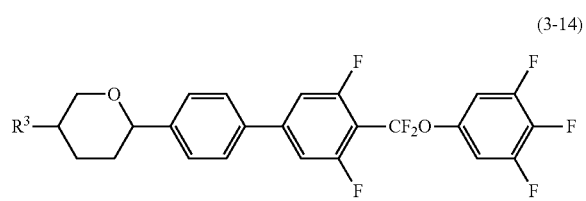 (3-14)
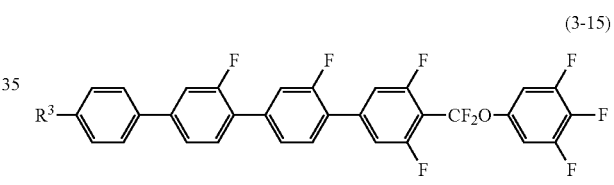 (3-15)
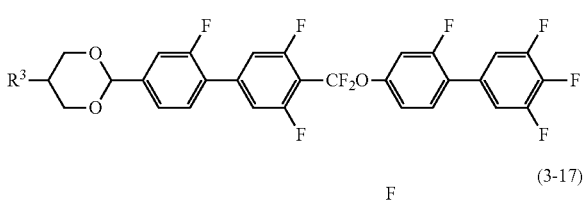 (3-16)
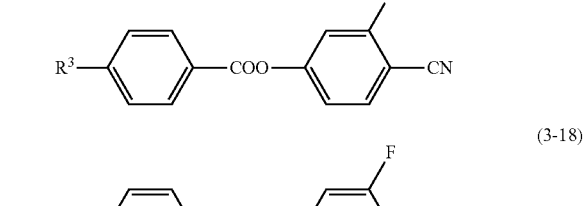 (3-17)
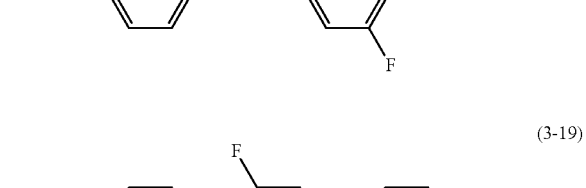 (3-18)
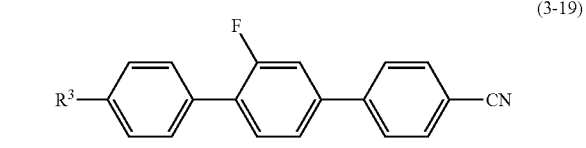 (3-19)

-continued

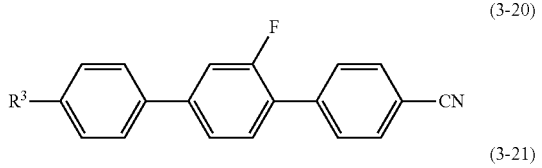
(3-20)

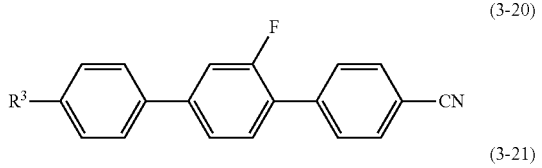
(3-21)

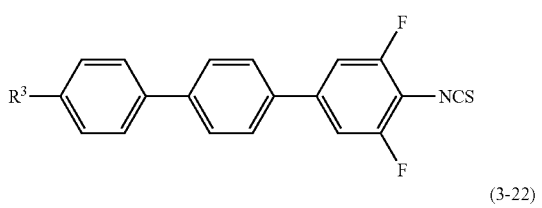
(3-22)

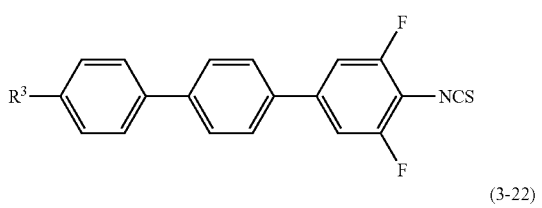
(3-23)

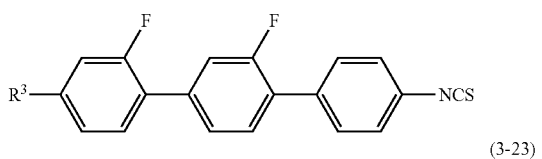
(3-24)

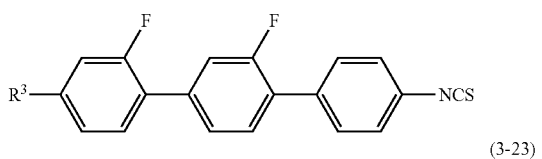
(3-25)

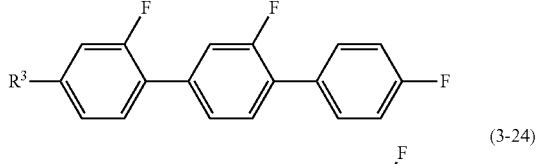
(3-26)

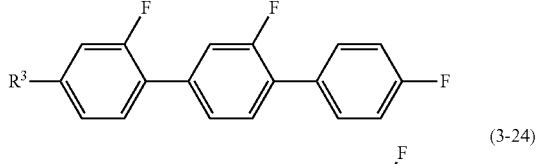
(3-27)

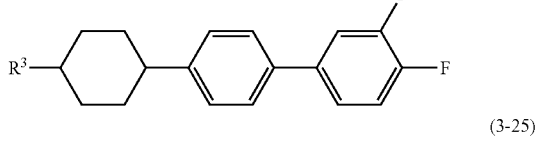
(3-28)

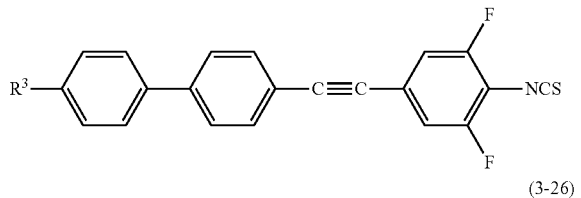

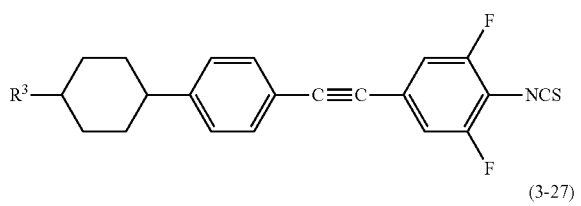

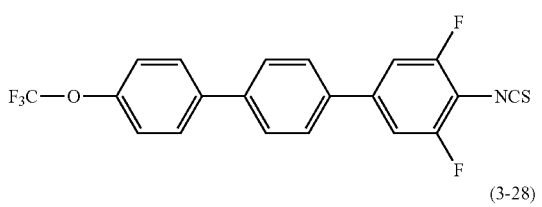

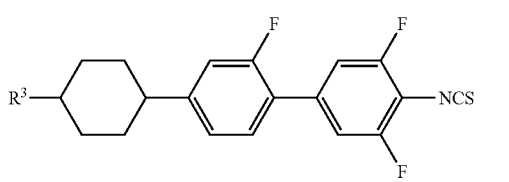

In these formulas, $R^3$ is alkyl having 1 to 12 carbon atoms, alkoxy having 1 to 12 carbon atoms, or alkenyl having 2 to 12 carbon atoms, and non-adjacent —CH$_2$— in $R^3$ may be replaced by —O—, —CO—, —COO—, —CH=CH—, or —C≡C—, but O atoms are not directly bonded to each other.

Item 9. The liquid crystal composition according to Item 7 or 8, wherein a proportion of the third component is in a range of 5% by mass to 30% by mass.

Item 10. The liquid crystal composition according to any one of Items 1 to 9, wherein refractive index anisotropy at 25° C. at a wavelength of 589 nm is 0.20 to 0.80.

Item 11. The liquid crystal composition according to any one of Items 1 to 10, wherein dielectric anisotropy at 25° C. at any frequency from 1 GHz to 10 THz is in a range of 0.40 to 2.0.

Item 12. The liquid crystal composition according to any one of Items 1 to 11, containing an optically active compound.

Item 13. The liquid crystal composition according to any one of Items 1 to 12, containing a polymerizable compound.

Item 14. An element used for phase control of an electromagnetic wave signal having any frequency from 1 GHz to 10 THz, containing the liquid crystal composition according to any one of Items 1 to 13.

The disclosure also includes the following items. (a) The above-described composition containing one compound, two compounds, or three or more compounds selected from additives such as optically active compounds, antioxidants, ultraviolet absorbers, quenchers, dyes, antifoaming agents, polymerizable compounds, polymerization initiators, polymerization inhibitors, and polar compounds. (b) An AM element containing the above-described composition. (c) The above-described composition further containing a polymerizable compound, and a polymer-supported orientation (PSA) type AM element containing the composition. (d) An element containing the above-described composition and having a mode of PC, TN, STN, ECB, OCB, IPS, VA, FFS, or FPA. (e) A transmission type element containing the above-described composition. (f) Use of the above-described composition as a composition having a nematic phase. (g) Use of an optically active composition obtained by adding an optically active compound to the above-described composition.

The liquid crystal composition of the disclosure has large dielectric anisotropy and a small tan δ in an electromagnetic wave signal frequency range of 1 GHz to 10 THz. Therefore, it is preferable that the liquid crystal composition is used in elements related to an electromagnetic wave of 1 GHz to 10 THz, and further 1 GHz to 50 GHz.

The composition of the disclosure is described in the following order. Firstly, a constituent of the composition is described. Secondly, main characteristics of the component compound and main effects of the compound on the composition and the element are described. Thirdly, a combination and a preferable proportion of the component compound in the composition and the basis thereof are described. Fourthly, a preferable form of the component compound is described. Fifthly, preferable component compounds are shown. Sixthly, additives that may be added to the composition are described. Seventhly, a synthesis method of the component compound is described. Finally, use of the composition is described.

Firstly, the constituent of the composition is described. The composition contains a plurality of liquid crystalline compounds. The composition may contain additives. The additives include optically active compounds, antioxidants, ultraviolet absorbers, quenchers, dyes, antifoaming agents, polymerizable compounds, polymerization initiators, polymerization inhibitors, polar compounds and the like.

The composition is classified into a composition (a) and a composition (b) from the viewpoint of a liquid crystalline compound. In addition to the liquid crystalline compound selected from Compound (1), Compound (2), and Compound (3), the composition (a) may further contain other liquid crystalline compounds, additives, and the like. The "other liquid crystalline compounds" are liquid crystalline compounds different from Compound (1), Compound (2), and Compound (3). These compounds are mixed into the composition for the purpose of further adjusting the characteristics.

The composition (b) substantially contains only the liquid crystalline compound selected from Compound (1), Compound (2), and Compound (3). "Substantially" means that the composition (b) may contain additives, but does not contain other liquid crystalline compounds. The composition (b) has a smaller number of components than the composition (a). The composition (b) is preferable to the composition (a) from the viewpoint of reducing the cost. From the viewpoint that the characteristics can be further adjusted by mixing other liquid crystalline compounds, the composition (a) is preferable to the composition (b).

Secondly, the main characteristics of the component compound and the main effects of the compound on the composition and the element are described. The main characteristics of the component compound are summarized in Table 1 based on the effect of the disclosure. In symbols of Table 1, L means large or high, M means medium, and S means small or low. The symbols L, M, and S are classifications based on qualitative comparisons between the component compounds, and the symbol 0 (zero) means smaller than S.

TABLE 1

Characteristics of liquid crystalline compound

| Compound | Compound (1) | Compound (2) | Compound (3) |
|---|---|---|---|
| Upper limit temperature | S to L | S to L | S to L |
| Viscosity | M to L | S to M | M to L |
| Refractive index anisotropy | M to L | S to L | S to M |
| Dielectric anisotropy | M to L | 0 | M to L |
| Specific resistance | L | L | L |

The main effects of the component compound are as follows.

Compound (1) mainly has an effect of increasing the dielectric anisotropy and increasing the refractive index anisotropy. The upper limit temperature and the viscosity can be adjusted according to the number of rings contained in the compound (the number of $n^1$ in Formula (1)). That is, if the number of rings is increased, the upper limit temperature is increased, the viscosity tends to be increased, and the lower limit temperature tends to be increased. On the other hand, if the number of rings is reduced, the upper limit temperature is not increased, the viscosity tends to be reduced, and the lower limit temperature tends to be lowered.

Compound (2) mainly has an effect of increasing the refractive index anisotropy and widening the temperature range of the nematic phase. The relationship between the number of rings contained in the compound (the number of $n^2$ in Formula (2)) and the upper limit temperature, the lower limit temperature, and the viscosity has the same tendency as that of Compound (1), but Compound (2) tends to have a greater effect of increasing the upper limit temperature, lowering the lower limit temperature, and reducing the viscosity than Compound (1).

Compound (3) has an effect of increasing the dielectric anisotropy. In the disclosure, the dielectric anisotropy is increased by Compound (1), but in order to realize a high switching characteristic and high energy efficiency, larger dielectric anisotropy is preferable. In the case in which the dielectric anisotropy is insufficient when only Compound (1) is used, the dielectric anisotropy is supplemented with Compound (3).

Thirdly, the combination of the components in the composition, the preferable proportion of the component compound, and the basis thereof are described. A preferable combination of the components in the composition is Compound (1)+Compound (2) or Compound (1)+Compound (2)+Compound (3), and a particularly preferable combination is Compound (1)+Compound (2) which can further increase the refractive index anisotropy and the dielectric anisotropy.

A preferable proportion of Compound (1) is in a range of about 5% by mass to about 60% by mass to suppress the increase of the lower limit temperature, increase the dielectric anisotropy, and increase the refractive index anisotropy. A further preferable proportion is in a range of about 10% by mass to about 50% by mass. A particularly preferable proportion is in a range of about 10% by mass to about 40% by mass.

A preferable proportion of Compound (2) is in a range of about 40% by mass to about 90% by mass to increase the refractive index anisotropy and widen the temperature range of the nematic phase. A further preferable proportion is in a range of about 50% by mass to about 90% by mass. A particularly preferable proportion is in a range of about 60% by mass to about 90% by mass.

A preferable proportion of Compound (3) is in a range of about 5% by mass to about 30% by mass to suppress the increase of the lower limit temperature, increase the dielectric anisotropy, and increase the refractive index anisotropy. A further preferable proportion is in a range of about 5% by mass to about 25% by mass. A particularly preferable proportion is in a range of about 5% by mass to about 20% by mass.

Fourthly, the preferable form of the component compound is described. In Formulas (1), (2), and (3), $R^1$ is alkyl having 1 to 12 carbon atoms, alkoxy having 1 to 12 carbon atoms, alkenyl having 2 to 12 carbon atoms, or alkenyloxy having 2 to 12 carbon atoms, non-adjacent —$CH_2$— in $R^1$ may be replaced by —O— or —S—, and hydrogen may be replaced by fluorine. Preferable $R^1$ is alkyl having 1 to 12 carbon atoms to increase the stability against light or heat.

$R^{21}$ and $R^{22}$ are alkyl having 1 to 12 carbon atoms, alkoxy having 1 to 12 carbon atoms, or alkenyl having 2 to 12 carbon atoms, and non-adjacent —$CH_2$— in $R^{21}$ and $R^{22}$ may be replaced by —O—, —CO—, —COO—, —CH=CH—, —C≡C—, or —S—, in which O atoms are not directly bonded to each other. Preferable $R^{21}$ and $R^{22}$ are alkyl having 1 to 12 carbon atoms to increase the stability against light or heat.

$R^3$ is alkyl having 1 to 12 carbon atoms, alkoxy having 1 to 12 carbon atoms, or alkenyl having 2 to 12 carbon atoms, and non-adjacent —$CH_2$— in $R^3$ may be replaced by —O—, —CO—, —COO—, —CH=CH—, —C≡C—, or —S—, in which O atoms are not directly bonded to each other, and hydrogen may be replaced by fluorine. Preferable $R^3$ is alkyl having 1 to 12 carbon atoms to increase the stability against light or heat.

Preferable alkyl is methyl, ethyl, propyl, butyl, pentyl, hexyl, heptyl, or octyl. Further preferable alkyl is methyl, ethyl, propyl, butyl, or pentyl to reduce the viscosity.

Preferable alkoxy is methoxy, ethoxy, propoxy, butoxy, pentyloxy, hexyloxy, or heptyloxy. Further preferable alkoxy is methoxy or ethoxy to reduce the viscosity.

Preferable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. Further preferable alkenyl is vinyl, 1-propenyl, 3-butenyl, or 3-pentenyl to reduce the viscosity. A preferable stereo configuration of —CH=CH— in these alkenyls depends on the position of the double bond. For the purpose of reducing the viscosity and other purposes, a trans configuration is preferable in the alkenyls such as 1-propenyl, 1-butenyl, 1-pentenyl, 1-hexenyl, 3-pentenyl, and 3-hexenyl. A cis configuration is preferable in the alkenyls such as 2-butenyl, 2-pentenyl, and 2-hexenyl.

Preferable alkenyloxy is vinyloxy, allyloxy, 3-butenyloxy, 3-pentenyloxy, or 4-pentenyloxy. Further preferable alkenyloxy is allyloxy or 3-butenyloxy to reduce the viscosity.

Ring $A^{11}$ is a group selected from a group consisting of Groups (A) and (B).

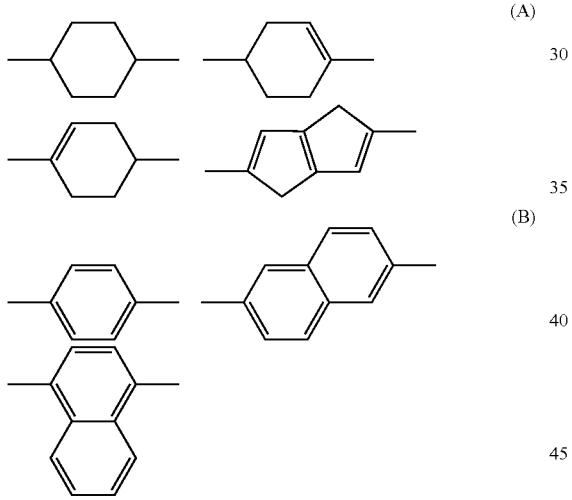

(A)

(B)

In groups of Group (A), non-adjacent —CH$_2$— may be replaced by —O— and/or —S—, in groups of Group (B), at least one —CH= may be replaced by —N=, and in groups of Groups (A) and (B), at least one hydrogen may be replaced by cyano, fluorine, alkyl having 1 to 5 carbon atoms, or cycloalkyl having 3 to 6 carbon atoms.

Examples of the ring $A^{11}$ are groups represented by following Formulas (I) to (XXII).

(I)

(II)

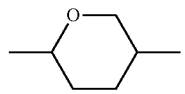

(III)

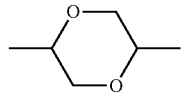

(IV)

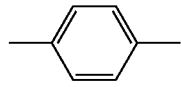

(V)

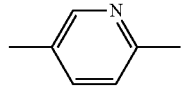

(VI)

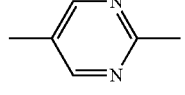

(VII)

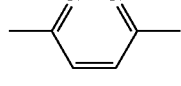

(VIII)

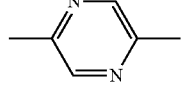

(IX)

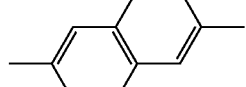

(X)

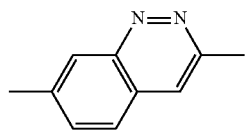

(XI)

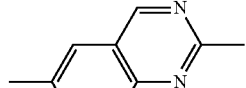

(XII)

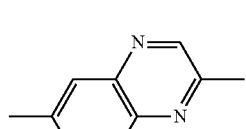

(XIII)

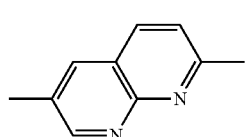

(XIV)

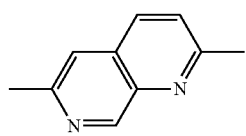

(XV)

(XVI)
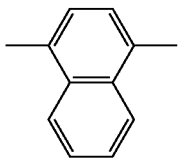

(XVII)
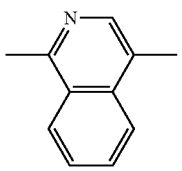

(XVIII)
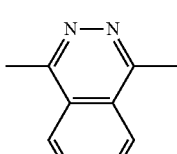

(XIX)
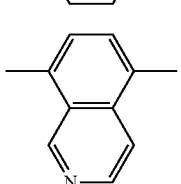

(XX)
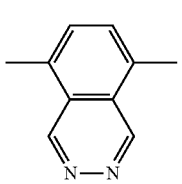

(XXI)
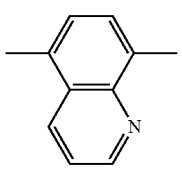

(XXII)
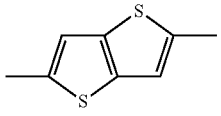

In these groups, hydrogen may be replaced by cyano, fluorine, alkyl having 1 to 5 carbon atoms, or cycloalkyl having 3 to 6 carbon atoms.

To increase the refractive index anisotropy and compatibility, a preferable ring $A^{11}$ is

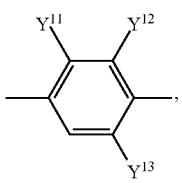

and $Y^{11}$, $Y^{12}$, and $Y^{13}$ are hydrogen, fluorine, methyl, ethyl, or cycloalkyl having 3 to 6 carbon atoms. Preferable $Y^{11}$, $Y^{12}$, and $Y^{13}$ are hydrogen to increase the refractive index anisotropy, and are fluorine, methyl, ethyl, or cyclopropane to increase the compatibility.

The ring $A^{12}$ is 1,4-phenylene, and at least one hydrogen may be replaced by cyano, fluorine, alkyl having 1 to 5 carbon atoms, or cycloalkyl having 3 to 6 carbon atoms. To increase the refractive index anisotropy and to increase the dielectric anisotropy, a preferable ring $A^{12}$ is 1,4-phenylene, and at least one hydrogen is replaced by fluorine.

Ring $A^2$ is 1,4-cyclohexylene, 1,4-phenylene, 2-fluoro-1,4-phenylene, 2,5-difluoro-1,4-phenylene, 2,6-difluoro-1,4-phenylene, 2,6-benzothiophene, or 7-fluoro-2,6-benzothiophene. A preferable ring $A^2$ is 1,4-cyclohexylene to reduce the viscosity, or is 1,4-phenylene to increase the refractive index anisotropy.

Ring $A^{31}$ is 1,4-cyclohexylene, 1,4-phenylene, 2-fluoro-1,4-phenylene, 2,5-difluoro-1,4-phenylene, 2,6-difluoro-1,4-phenylene, pyridine-2,5-diyl, pyrimidine-2,5-diyl, 1,3-dioxane-2,5-diyl, or tetrahydropyran-2,5-diyl. A preferable ring $A^{31}$ is 1,4-phenylene, 2-fluoro-1,4-phenylene, or 2,6-difluoro-1,4-phenylene to increase the refractive index anisotropy.

Ring $A^{32}$ is 1,4-phenylene, 2-fluoro-1,4-phenylene, 2,5-difluoro-1,4-phenylene, 2,6-difluoro-1,4-phenylene, pyridine-2,5-diyl, or pyrimidine-2,5-diyl. A preferable ring $A^{32}$ is 1,4-phenylene, 2-fluoro-1,4-phenylene, or 2,6-difluoro-1,4-phenylene to increase the refractive index anisotropy.

Tetrahydropyran-2,5-diyl is

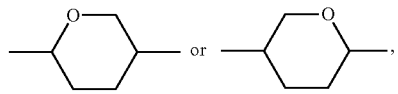

and is preferably

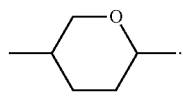

$Z^{11}$ is a single bond, —CH=CH—, or —C≡C—, $Z^{12}$ is a single bond, —CH$_2$CH$_2$—, —CH=CH—, or —C≡C—, multiple $Z^{12}$ may be the same or different, but one of the $Z^{12}$ is —CH$_2$CH$_2$—, —CH=CH—, or —C≡C—, and multiple $Z^{12}$ may all be single bonds when hydrogen of $R^1$ is replaced by fluorine, when $Z^{11}$ is —C≡C—, or when at least one hydrogen in the ring $A^{11}$ is replaced by cyano, alkyl having 1 to 5 carbon atoms, or cycloalkyl having 3 to 6 carbon atoms. To increase the refractive index anisotropy, preferable $Z^{11}$ and $Z^{12}$ are —CH=CH— or —C≡C—, and further preferable $Z^{11}$ and $Z^{12}$ are —C≡C—.

$Z^{21}$ and $Z^{22}$ are single bonds, —CH$_2$CH$_2$—, —CH=CH—, —C≡C—, —COO—, or —C≡C—C≡C—. Preferable $Z^{21}$ and $Z^{22}$ are —C≡C— or —C≡C—C≡C— to increase the refractive index anisotropy.

$Z^{31}$ and $Z^{32}$ are single bonds, —CH$_2$CH$_2$—, —CH=CH—, —C≡C—, —COO—, or —CF$_2$O—. Preferable $Z^{31}$ and $Z^{32}$ are —CF$_2$O— to increase the dielectric anisotropy.

In carbonyloxy, —COO— is preferable to —OCO—. In difluoromethyleneoxy, —CF$_2$O— is preferable to —OCF$_2$—.

$X^3$ is —F, —Cl, —CF$_3$, —OCF$_3$, —C≡C—CF$_3$, —C≡C—OCF$_3$, —CN, or —NCS. Preferable $X^3$ is —F, —OCF₃, —CN, or —NCS to increase the dielectric anisotropy, and further considering stability, preferable X³ is —F or —OCF₃. In addition, preferable X³ is —C≡C—CF₃ and —C≡C—OCF₃ to increase the refractive index anisotropy and increase the dielectric anisotropy.

$Y^{21}$ and $Y^{22}$ are hydrogen, fluorine, alkyl having 1 to 5 carbon atoms, or cycloalkyl having 3 to 6 carbon atoms. Preferable $Y^{21}$ and $Y^{22}$ are fluorine to increase the dielectric anisotropy, and are ethyl and cyclopropyl to increase the compatibility.

$Y^{23}$, $Y^{24}$, and $Y^{25}$ are hydrogen or fluorine, but $Y^{24}$ and $Y^{25}$ are not fluorine at the same time. Preferable $Y^{23}$, $y^{24}$, and $Y^{25}$ are fluorine to reduce the lower limit temperature.

$Y^{31}$, $Y^{32}$, and $Y^{33}$ are hydrogen or fluorine, but $Y^{31}$ and $Y^{32}$ are not fluorine at the same time. Preferable $Y^{31}$ is hydrogen, and preferable $Y^{32}$ and $Y^{33}$ are fluorine to increase the dielectric anisotropy.

$n^1$ is 1, 2, or 3. Preferable $n^1$ is 1 when priority is given to the reduction of the viscosity and the reduction of the lower limit temperature, and is 3 when priority is given to the increase of the upper limit temperature and the increase of the refractive index anisotropy. In the disclosure, $n^1$ is more preferably 1 because of the combination with Compound (2) having a high upper limit temperature in order to increase the refractive index anisotropy.

$n^2$ is 0, 1, or 2. Preferable $n^2$ is 0 when priority is given to the reduction of the viscosity, and is 1 or 2 when priority is given to the increase of the upper limit temperature and the increase of the refractive index anisotropy. In the disclosure, $n^2$ is more preferably 0 or 1 to increase the refractive index anisotropy and adjust the temperature range of the nematic phase.

$n^3$ is 1, 2, or 3. Preferable $n^3$ is 1 when priority is given to the reduction of the viscosity, and is 2 or 3 when priority is given to the increase of the upper limit temperature and the increase of the refractive index anisotropy. In the disclosure, $n^3$ is more preferably 2 to increase the upper limit temperature and increase the refractive index anisotropy within the range in which the lower limit temperature is not increased.

Fifthly, preferable component compounds are shown. Preferable Compounds (1) are Compounds (1-1) to (1-9) according to Item 2. Preferably, in these compounds, at least one of the first components is Compound (1-1), Compound (1-2), or Compound (1-3).

Preferable Compounds (2) are Compounds (2-1) to (2-21) according to Item 5. Preferably, in these compounds, at least one of the second components is Compound (2-2), Compound (2-3), Compound (2-4), Compound (2-7), Compound (2-9), Compound (2-11), Compound (2-12), Compound (2-13), Compound (2-17), or Compound (2-19).

Preferable Compounds (3) are Compounds (3-1) to (3-28) according to Item 8. Preferably, at least one of the third components is Compound (3-1), Compound (3-2), Compound (3-3), Compound (3-7), Compound (3-9), Compound (3-10), Compound (3-11), Compound (3-12), or Compound (3-14).

Sixthly, the additives that may be added to the composition are described. The additives include optically active compounds, antioxidants, ultraviolet absorbers, quenchers, antifoaming agents, polymerizable compounds, polymerization initiators, polymerization inhibitors, polar compounds, and the like. An optically active compound is added to the composition for the purpose of inducing a helical structure of a liquid crystal molecule to give a twist angle. Examples of the compound are Compounds (4-1) to (4-5). A preferable proportion of the optically active compound is about 5% by mass or less. A further preferable proportion is in a range of about 0.010% by mass to about 2% by mass.

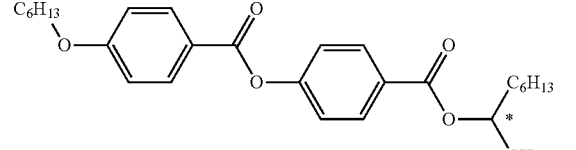

(4-1)

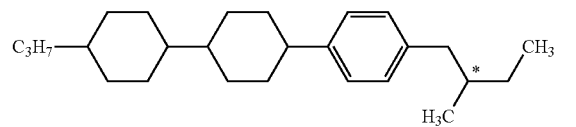

(4-2)

(4-3)

(4-4)

(4-5)

In order to prevent the reduction of the specific resistance due to heating in the atmosphere, or to maintain a large voltage retention rate not only at room temperature but also at a temperature close to the upper limit temperature after the element is used for a long time, antioxidants such as Compounds (5-1) to (5-3) may be further added to the composition.

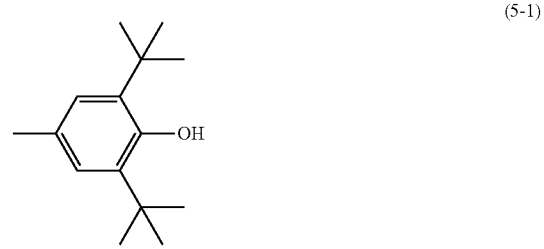

(5-1)

(5-2)

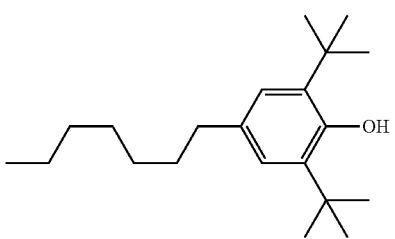

(5-3)

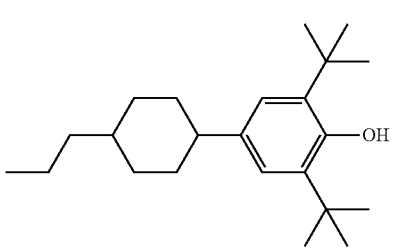

The compound having low volatility is effective to maintain a large voltage retention rate not only at room temperature but also at a temperature close to the upper limit temperature after the element is used for a long time. A preferable proportion of the antioxidant is about 50 ppm or more to obtain the effect, and is about 600 ppm or less so as not to lower the upper limit temperature or increase the lower limit temperature. A further preferable proportion is in a range of about 100 ppm to about 300 ppm.

Preferable examples of the ultraviolet absorber are benzophenone derivatives, benzoate derivatives, triazole derivatives, and the like. Light stabilizers such as sterically hindered amines are also preferable. Preferable examples of the light stabilizer are Compounds (6-1) to (6-16). A preferable proportion of the absorbents and stabilizers is about 50 ppm or more to obtain the effect, and is about 10000 ppm or less so as not to lower the upper limit temperature or increase the lower limit temperature. A further preferable proportion is in a range of about 100 ppm to about 10000 ppm.

(6-1)

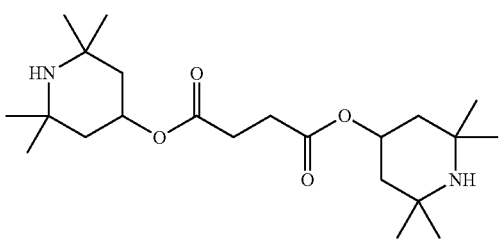

(6-2)

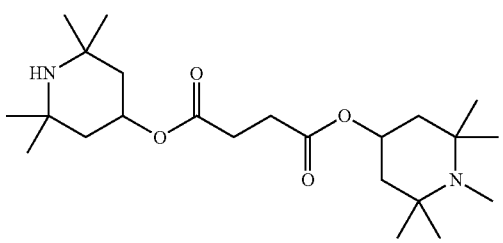

(6-3)

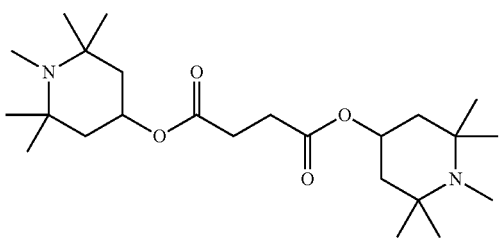

(6-4)

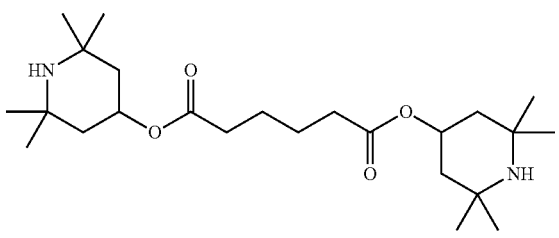

(6-5)

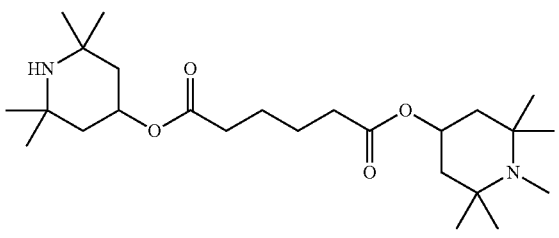

(6-6)

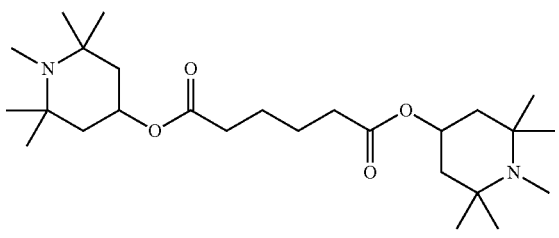

(6-7)

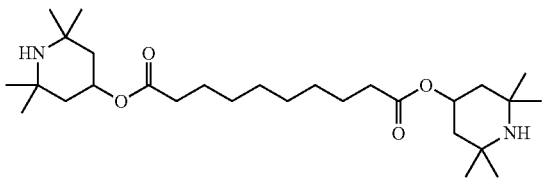

(6-8)

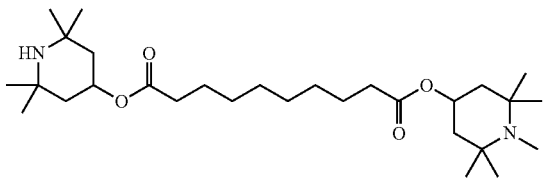

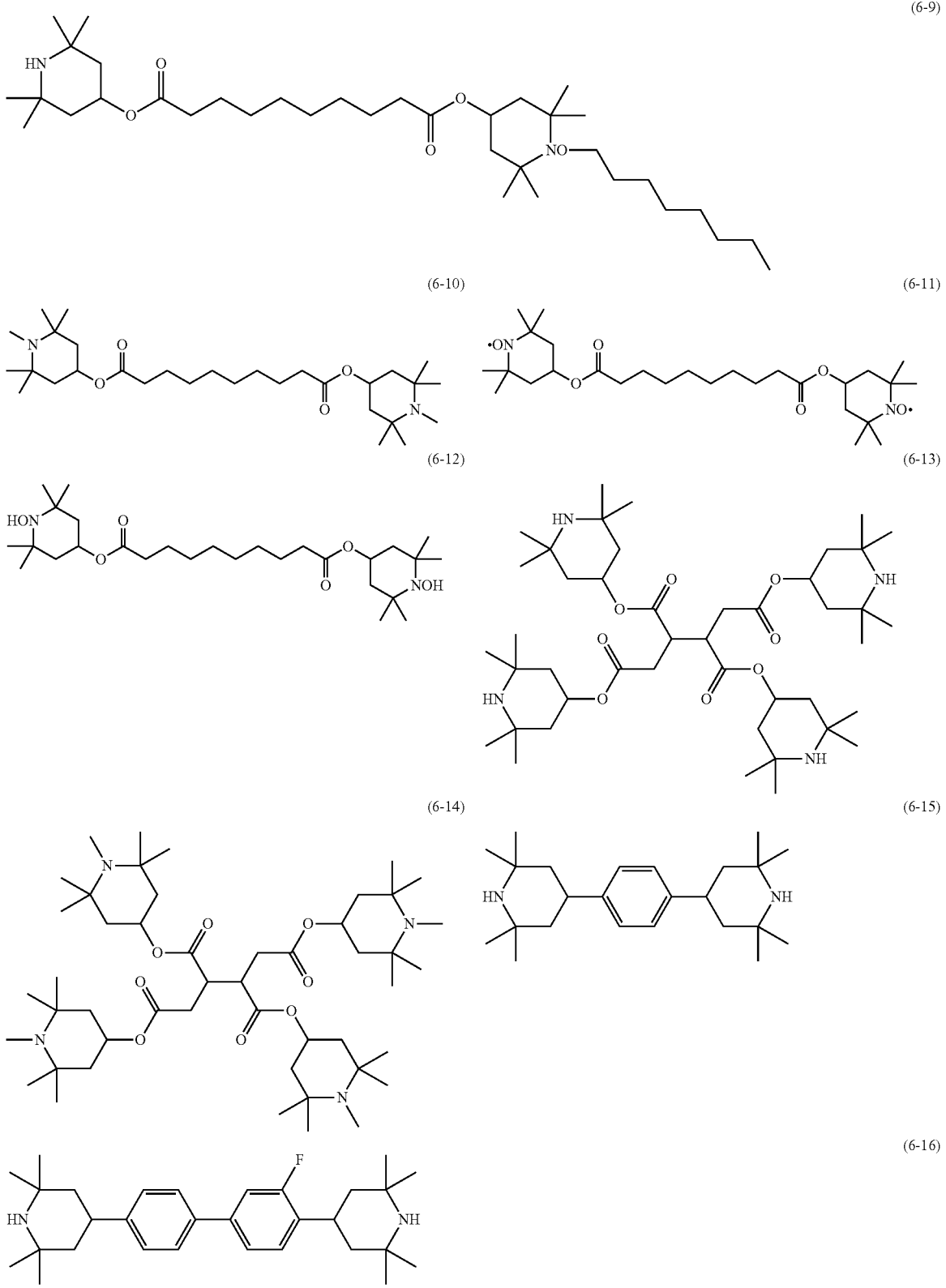
The quencher is a compound that prevents decomposition of the liquid crystalline compound by receiving light energy absorbed by the liquid crystalline compound and converting the light energy into heat energy. Preferable examples of the quencher are Compounds (7-1) to (7-7) and the like. A preferable proportion of the quenchers is about 50 ppm or more to obtain the effect, and is about 20000 ppm or less to reduce the lower limit temperature. A further preferable proportion is in a range of about 100 ppm to about 10000 ppm.

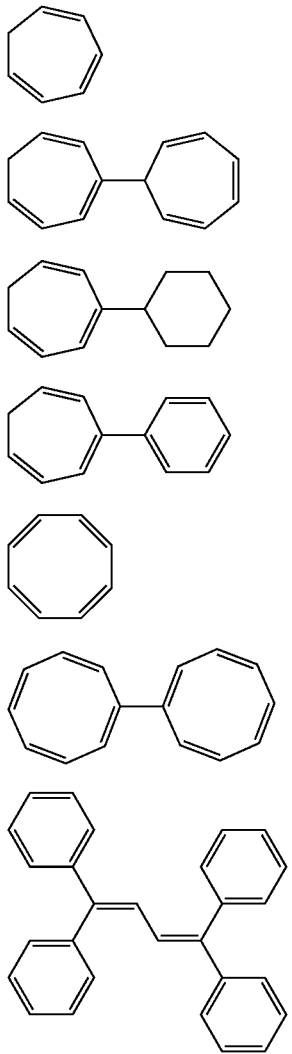

(7-1)
(7-2)
(7-3)
(7-4)
(7-5)
(7-6)
(7-7)

A preferable additive as a stabilizer against ultraviolet rays and heat is an amino-tolane compound shown in Compound (8), or the like (U.S. Pat. No. 6,495,066).

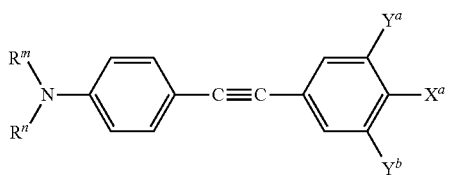

(8)

In Formula (8), $R^m$ and $R^n$ are alkyl having 1 to 12 carbon atoms, alkoxy having 1 to 12 carbon atoms, alkenyl having 2 to 12 carbon atoms, or alkenyloxy having 2 to 12 carbon atoms; $X^a$ is —$NO_2$, —CN, —NCS, —F, or —$OCF_3$; and $Y^a$ and $Y^b$ are hydrogen or fluorine. In order to obtain the effect, a preferable proportion of the stabilizers is in a range of 1% by mass to 20% by mass, and preferably in a range of 5% by mass to 10% by mass.

A polymerizable compound is added to the composition to conform to the polymer-supported orientation (PSA) type element. Preferable examples of the polymerizable compound are compounds such as acrylate, methacrylate, vinyl compounds, vinyloxy compounds, propenyl ether, epoxy compounds (oxylane and oxetane), vinyl ketone, and the like. A further preferable example is a derivative of acrylate or methacrylate. A preferable proportion of the polymerizable compound is about 0.05% by mass or more to obtain the effect, and is about 10% by mass or less to prevent the increase of viscosity and orientation defects. A further preferable proportion is in a range of about 0.1% by mass to about 2% by mass. The polymerizable compound is polymerized by ultraviolet ray irradiation. The polymerization may be carried out in the presence of an initiator such as a photopolymerization initiator or the like. The appropriate condition for polymerization and the appropriate type and the appropriate amount of the initiator are known to the person skilled in the art, and are described in the literature. For example, Irgacure 651 (registered trademark; BASF), Irgacure 184 (registered trademark; BASF), or Darocur 1173 (registered trademark; BASF), which is a photopolymerization initiator, is appropriate to radical polymerization. A preferable proportion of the photopolymerization initiator is in a range of about 0.1% by mass to about 5% by mass based on the mass of the polymerizable compound. A further preferable proportion is in a range of about 1% by mass to about 3% by mass.

When the polymerizable compound is stored, a polymerization inhibitor may be added to prevent the polymerization. The polymerizable compound is usually added to the composition without removing the polymerization inhibitor. Examples of the polymerization inhibitor are hydroquinone, a hydroquinone derivative such as methylhydroquinone, 4-tert-butylcatechol, 4-methoxyphenol, phenothiazine, and the like.

In the specification, the polar compound is an organic compound having a polarity, and a compound having an ionic bond is not included. Atoms such as oxygen, sulfur, and nitrogen are more electrically negative and tend to have partial negative charges. Carbon and hydrogen are neutral or tend to have partial positive charges. The polarity arises because the partial charges are not evenly distributed between atoms of different species in the compound. For example, the polar compound has at least one of partial structures such as —OH, —COOH, —SH, —$NH_2$, >NH, and >N—.

Seventh, the synthesis method of the component compound is described. These compounds can be synthesized by methods described in books such as Organic Syntheses (John Wiley & Sons, Inc), Organic Reactions (John Wiley & Sons, Inc), Comprehensive Organic Synthesis (Pergamon Press), New Experimental Chemistry Course (Maruzen), and the like. The composition is prepared by a known method from the compound obtained in this way. For example, the component compounds are mixed and then mutually dissolved by heating.

Finally, the use of the composition is described. The composition mainly has a lower limit temperature of about −10° C. or lower, an upper limit temperature of about 70° C. or higher, and refractive index anisotropy in a range of about 0.20 to about 0.80. The composition having refractive index anisotropy in a range of about 0.30 to about 0.60 may be prepared by controlling the proportion of the component compound or by mixing other liquid crystalline compounds. The composition having refractive index anisotropy in a range of about 0.40 to about 0.55 may be prepared by trial and error. This composition can be used as a composition having a nematic phase, and can be used as an optically active composition by adding an optically active compound.

This composition can be used in the element used for phase control of an electromagnetic wave signal having a frequency of 1 GHz to 10 THz. Application examples include, for example, a millimeter-wave band variable phase shifter, a light detection and ranging (LiDAR) element, an antenna to which a metamaterial technology is applied, and the like.

The dielectric anisotropy of the composition is desired to be large in order to reduce the drive voltage of the element. Particularly, in a mode in which the electric field applied to the liquid crystal composition is limited by polymer stabilization or encapsulation, the drive voltage tends to be high, and thus the dielectric anisotropy is preferably as large as possible. The dielectric anisotropy is preferably in a range of 1 to 40, and further preferably in a range of 1 to 20.

EXAMPLE

The disclosure is described in more detail by examples. The disclosure is not limited by these examples. The disclosure also includes a mixture obtained by mixing at least two of the compositions of the examples.

Measurement method: the measurement of the characteristics was performed by the following methods. Many of these methods are methods described in JEITA standard (JEITA-ED-2521B) which is deliberated and enacted by Japan Electronics and Information Technology Industries Association (hereinafter referred to as JEITA), or methods obtained by modifying the above-described methods. A thin film transistor (TFT) was not attached to a TN element used for the measurement.

Upper limit temperature of nematic phase (NI; ° C.): a sample was placed on a hot plate of a melting point measurement device equipped with a polarizing microscope, and was heated at a rate of 1° C./min. The temperature at which a part of the sample was changed from the nematic phase to an isotropic liquid was measured. The upper limit temperature of the nematic phase may be abbreviated as "upper limit temperature".

Lower limit temperature of nematic phase ($T_C$; ° C.): a sample having a nematic phase was put into a glass bottle and stored in a freezer at 0° C., −10° C., −20° C., −30° C., and −40° C. for 10 days, and then the liquid crystal phase was observed. For example, when the sample remained in the nematic phase at −20° C. and changed to a crystal or a smectic phase at −30° C., $T_C$ was described as <−20° C. The lower limit temperature of the nematic phase may be abbreviated as "lower limit temperature".

Viscosity (bulk viscosity; η; measured at 20° C.; mPa·s): an E-type rotation viscometer manufactured by Tokyo Keiki Inc. was used for the measurement.

Refractive index anisotropy (when Δn<0.30; measured at 25° C.): the measurement was performed using light having a wavelength of 589 nm by an Abbe refractometer in which a polarizing plate was attached to an eyepiece. After a surface of a main prism was rubbed in one direction, a sample was dropped onto the main prism. A refractive index n// was measured when the polarization direction was parallel to the rubbing direction. A refractive index n⊥ was measured when the polarization direction was perpendicular to the rubbing direction. The value of the refractive index anisotropy was calculated from Formula Δn=n//−n⊥.

Refractive index anisotropy (when Δn≥0.30; measured at 25° C.): a sample was put into an element configured by two glass substrates and was oriented in an anti-parallel manner. The thickness direction retardation (Rth) of this element was measured using a phase difference film/optical material inspection device (manufactured by Otsuka Electronics Co., Ltd., product name: RETS-100), and the refractive index anisotropy (Δn) was calculated from the retardation value (Rth) and an interval (d: cell gap) of the glass substrates by the following formula. The wavelength of the light used is 589 nm.

$$Rth = \Delta n \cdot d$$

Dielectric anisotropy (Δε; measured at 25° C.): a sample was put into a TN element having an interval (a cell gap) of 9 μm between two glass substrates and a twist angle of 80 degrees. A sine wave (10 V, 1 kHz) was applied to the element, and after two seconds, a dielectric constant (ε//) of the liquid crystal molecule in a long axis direction was measured. A sine wave (0.5 V, 1 kHz) was applied to the element, and after two seconds, a dielectric constant (ε⊥) of the liquid crystal molecule in a short axis direction was measured. The value of the dielectric anisotropy was calculated from Formula Δε=ε//−ε⊥.

Refractive index anisotropy at 28 GHz (measured at room temperature): the measurement was performed by the method disclosed in Applied Optics, Vol. 44, No. 7, p 1150 (2005). Regarding the refractive index anisotropy, a liquid crystal was filled in a variable short-circuit waveguide to which a window material was attached, and the liquid crystal was held in a static magnetic field of 0.3 T for three minutes. A microwave of 28 GHz was input to the waveguide, and an amplitude ratio of the reflected wave with respect to the incident wave was measured. A direction of the static magnetic field and a tube length of the short circuit apparatus were changed and measured, and the refractive index (n: ne, no) and a loss parameter (α: αe, αo) were determined. The refractive index anisotropy (Δn at 28 GHz) was calculated from ne−no.

Tan δ and dielectric anisotropy at 28 GHz (measured at room temperature): the refractive index and the loss parameter calculated in the previous section and the following relation equations were used to calculate the complex dielectric constant (ε', ε"). Here, c is the speed of light in vacuum, ω is the angular velocity, and κ is the extinction coefficient. Regarding the dielectric anisotropy, $\varepsilon'_{\parallel}$ was calculated from ne, $\varepsilon'_{\perp}$ was calculated from no, and the dielectric anisotropy (Δε at 28 GHz) was calculated from $\varepsilon_{\parallel} - \varepsilon_{\perp}$. Besides, tan δ (tan δ at 28 GHz) was calculated in a form of tan δ=ε"/ε' using the complex dielectric constant (ε', ε"). Because anisotropy was also exhibited in tan δ, tan δ at 28 GHz having a larger value was recorded.

$$\varepsilon' = n^2 - \kappa^2$$

$$\varepsilon'' = 2\pi\kappa$$

$$\alpha = 2\omega\kappa/c$$

The compounds in the examples were represented by the symbols based on the definition in Table 2 below. In Table 2, the stereo configuration related to 1,4-cyclohexylene is a trans configuration. The number in parentheses after the symbol corresponds to the compound number. The proportion (percentage) of the liquid crystalline compound is a mass percentage (% by mass) based on the mass of the liquid crystal composition. Finally, the characteristic values of the composition were summarized.

TABLE 2

| Notation method of compounds using symbols |  |
|---|---|
| R—(A$_1$)—Z$_1$— . . . —Z$_n$—(A$_n$)—R' |  |
| 1) Left terminal group R— | Symbol |
| C$_n$H$_{2n+1}$— | n- |
| C$_n$H$_{2n+1}$O— | nO— |
| C$_m$H$_{2m+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$— | Vn— |
| C$_m$H$_{2m+1}$—CH=CH—C$_n$H$_{2n}$— | mVn— |
| CF$_2$=CH— | VFF— |
| CF$_2$=CH—C$_n$H$_{2n}$— | VFFn— |
| F—C$_n$H$_{2n}$— | Fn— |
| 2) Right terminal group —R' | Symbol |
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | —nV |
| —C$_n$H$_{2n}$—CH=CH—C$_m$H$_{2m+1}$ | —nVm |
| —CH=CF$_2$ | —VFF |
| —COOCH$_3$ | —EMe |
| —F | —F |
| —Cl | —CL |
| —OCF$_3$ | —OCF3 |
| —CF$_3$ | —CF3 |
| —CN | —C |
| —C≡C—CN | —TC |
| 3) Bonding group —Z$_n$— | Symbol |
| —C$_n$H$_{2n}$— | n |
| —COO— | E |
| —CH=CH— | V |
| —C≡C— | T |
| —CF$_2$O— | X |
| —CH$_2$O— | 1O |
| 4) Ring structure —A$_n$— | Symbol |
|  | H |
|  | B |
| 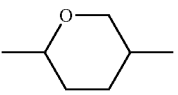 | Dh |
| 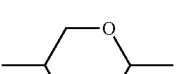 | dh |
| 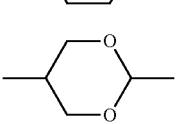 | G |

TABLE 2-continued

| Notation method of compounds using symbols |  |
|---|---|
| R—(A$_1$)—Z$_1$— . . . —Z$_n$—(A$_n$)—R' |  |
| 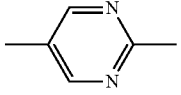 | Py |
| 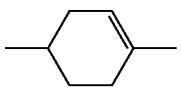 | ch |
| 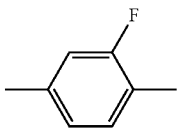 | B(F) |
| 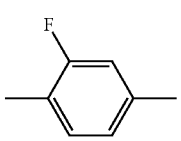 | B(2F) |
| 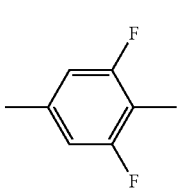 | B(F,F) |
| 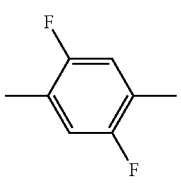 | B(2F,5F) |
| 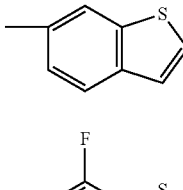 | bt |
| 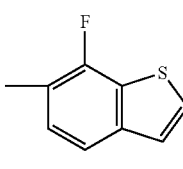 | bt(7F) |
| 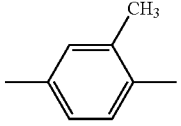 | B(Me) |
| 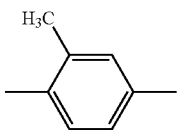 | B(2Me) |

TABLE 2-continued

Notation method of compounds using symbols

R—(A₁)—Z₁— ... —Zₙ—(Aₙ)—R'

5) Notation example

Example 1 3-BB(F)TB-4

$C_3H_7$—⟨benzene⟩—⟨benzene-F⟩—C≡C—⟨benzene⟩—$C_4H_9$

Example 2 4-BTTB-O1

$C_4H_9$—⟨benzene⟩—C≡C—C≡C—⟨benzene⟩—$OCH_3$

Example 3 2O-bt(7F)B(2F)B-3

$C_2H_5O$—⟨benzothiophene-F⟩—⟨benzene-F⟩—⟨benzene⟩—$C_3H_7$

Example 4 2O-btTB-3

$C_2H_5O$—⟨benzothiophene⟩—C≡C—⟨benzene⟩—$C_3H_7$

Example 5 5-B(F)TB(F)-TC $C_5H_{11}$—⟨benzene-F⟩—C≡C—⟨benzene-F⟩—C≡C—CN

Example 6 5-B(F)TB(Me)-TC $C_5H_{11}$—⟨benzene-F⟩—C≡C—⟨benzene-CH₃⟩—C≡C—CN

Example 7 5-BTB(F,F)-TC $C_5H_{11}$—⟨benzene⟩—C≡C—⟨benzene-F,F⟩—C≡C—CN

Example 8 5-BTB(2Me)-TC $C_5H_{11}$—⟨benzene⟩—C≡C—⟨benzene-CH₃⟩—C≡C—CN

[Comparative Example 1] Liquid Crystal Composition 1

| | | |
|---|---|---|
| 2-BTB-O1 | (2-3) | 7% |
| 3-BTB-O1 | (2-3) | 7% |
| 4-BTB-O1 | (2-3) | 7% |
| 4-BTB-O2 | (2-3) | 7% |
| 5-BTB-O1 | (2-3) | 6% |
| 1-BB(F)B-2V | (2-7) | 6% |
| 2-BB(F)B-2V | (2-7) | 6% |
| 3-BB(F)B-2V | (2-7) | 7% |
| 3-H2BTB-2 | (2-10) | 2% |
| 3-H2BTB-3 | (2-10) | 2% |
| 3-HB(F)TB-2 | (2-11) | 7% |
| 3-HB(F)TB-3 | (2-11) | 6% |
| 3-HB(F)TB-4 | (2-11) | 6% |
| 3-BB(F, F)XB(F, F)-F | (3-1) | 5% |
| 3-BB(F)B(F, F)-F | (3-2) | 9% |
| 3-BB(F, F)XB(F)B(F, F)-F | (3-12) | 10% |

NI=100.6° C.; Tc<−30° C.; Δn=0.26; Δε=5.1; η=36.4 mPa·s

The dielectric anisotropy and the tan δ of the liquid crystal composition 1 at 28 GHz were as follows.

Δε at 28 GHz=0.62 tan δ at 28 GHz=0.015

[Comparative Example 2] Liquid Crystal Composition 2

| | | |
|---|---|---|
| 2-BTB-O1 | (2-3) | 8% |
| 3-BTB-O1 | (2-3) | 8% |
| 4-BTB-O1 | (2-3) | 8% |
| 4-BTB-O2 | (2-3) | 8% |
| 5-BTB-O1 | (2-3) | 7% |
| 3-H2BTB-2 | (2-10) | 4% |
| 3-H2BTB-3 | (2-10) | 3% |
| 3-H2BTB-4 | (2-10) | 2% |
| 3-HB(F)TB-2 | (2-11) | 9% |
| 3-HB(F)TB-3 | (2-11) | 8% |
| 3-HB(F)TB-4 | (2-11) | 8% |
| 3-BB(F, F)XB(F, F)-F | (3-1) | 1% |
| 3-BB(F)B(F, F)-F | (3-2) | 14% |
| 3-BB(F, F)XB(F)B(F, F)-F | (3-12) | 12% |

NI=99.3° C.; Tc<−30° C.; Δn=0.26; Δε=5.5; η=36.4 mPa·s

The dielectric anisotropy and the tan δ of the liquid crystal composition 2 at 28 GHz were as follows.

Δε at 28 GHz=0.59 tan δ at 28 GHz=0.014

[Comparative Example 3] Liquid Crystal Composition 3

| | | |
|---|---|---|
| 3-HB-O2 | (2-1) | 8% |
| 1-BB-3 | (2-2) | 9% |
| 1-BB(F)B-2V | (2-7) | 4% |
| 2-BB(F)B-2V | (2-7) | 4% |
| 3-BB(F)B-2V | (2-7) | 5% |
| 2-BB(F)B-3 | (2-7) | 10% |
| 2-BB(F)B-5 | (2-7) | 10% |
| 3-BB(F)B-5 | (2-7) | 10% |
| 3-BB(2F, 5F)B-3 | (2-8) | 5% |
| 5-HBB(F)B-2 | (2-18) | 6% |
| 5-HBB(F)B-3 | (2-18) | 7% |
| 3-BB(F, F)XB(F, F)-F | (3-1) | 10% |
| 3-BB(F, F)XB(F)B(F, F)-F | (3-12) | 12% |

NI=108.9° C.; Tc<−20° C.; Δn=0.23; Δε=5.2; η=45.8 mPa·s

The dielectric anisotropy and the tan δ of the liquid crystal composition 3 at 28 GHz were as follows.
Δε at 28 GHz=0.54
tan δ at 28 GHz=0.011

[Comparative Example 4] Liquid Crystal Composition 4

| | | |
|---|---|---|
| 2-BTB-O1 | (2-3) | 6% |
| 3-BTB-O1 | (2-3) | 5% |
| 4-BTB-O1 | (2-3) | 5% |
| 4-BTB-O2 | (2-3) | 5% |
| 5-BTB-O1 | (2-3) | 5% |
| 3-BTTB-O1 | (2-4) | 13% |
| 5-BTTB-O1 | (2-4) | 13% |
| 3-BB(F)TB-4 | (2-12) | 20% |
| 2-BTB(F)TB-5 | (2-13) | 8% |
| 3-BB(F, F)XB(F)B(F, F)-F | (3-12) | 10% |
| 3-GB(F)B(F)B(F)-F | (3-10) | 5% |
| 3-GBB(F)B(F, F)-F | (3-11) | 2% |
| 4-GBB(F)B(F, F)-F | (3-11) | 3% |

NI=130.0° C.; Tc<−30° C.; Δn=0.37; Δε=4.6
The dielectric anisotropy and the tan δ of the liquid crystal composition 3 at 28 GHz were as follows.
Δε at 28 GHz=0.85
tan δ at 28 GHz=0.016

[Example 1] Liquid Crystal Composition 5

| | | |
|---|---|---|
| 5-B(F)TB(F)-TC | (1-1) | 15% |
| 2-BTB-O1 | (2-3) | 4% |
| 3-BTB-O1 | (2-3) | 3% |
| 4-BTB-O1 | (2-3) | 3% |
| 4-BTB-O2 | (2-3) | 3% |
| 5-BTB-O1 | (2-3) | 3% |
| 3-BTTB-O1 | (2-4) | 15% |
| 5-BTTB-O1 | (2-4) | 15% |
| 3-BB(F)TB-4 | (2-12) | 24% |
| 3-BB(F, F)XB(F)B(F, F)-F | (3-12) | 5% |
| 3-BB(F)B-C | (3-20) | 10% |

NI=131.6° C.; Δn=0.39; Δε=6.9
The dielectric anisotropy and the tan δ of the liquid crystal composition 5 at 28 GHz were as follows.
Δε at 28 GHz=0.91
tan δ at 28 GHz=0.014

[Example 2] Liquid Crystal Composition 6

| | | |
|---|---|---|
| 5-B(F)TB(F)-TC | (1-1) | 15% |
| 2-BTB-O1 | (2-3) | 5% |
| 3-BTB-O1 | (2-3) | 5% |
| 4-BTB-O1 | (2-3) | 5% |
| 4-BTB-O2 | (2-3) | 4% |
| 5-BTB-O1 | (2-3) | 4% |
| 3-BTTB-O1 | (2-4) | 15% |
| 5-BTTB-O1 | (2-4) | 15% |
| 5-BTB(F)TB-2 | (2-13) | 9% |
| 5-BTB(F)TB-3 | (2-13) | 9% |
| 3-BB(F, F)XB(F)B(F, F)-F | (3-12) | 5% |
| 3-GB(F)B(F)B(F)-F | (3-10) | 5% |
| 3-GBB(F)B(F, F)-F | (3-11) | 2% |
| 4-GBB(F)B(F, F)-F | (3-11) | 2% |

NI=127.2° C.; Δn=0.40; Δε=10.5

The dielectric anisotropy and the tan δ of the liquid crystal composition 6 at 28 GHz were as follows.
Δε at 28 GHz=0.93
tan δ at 28 GHz=0.014

[Example 3] Liquid Crystal Composition 7

| | | |
|---|---|---|
| 5-B(F)TB(F)-TC | (1-1) | 15% |
| 2-BTB-O1 | (2-3) | 2% |
| 3-BTB-O1 | (2-3) | 2% |
| 4-BTB-O1 | (2-3) | 2% |
| 4-BTB-O2 | (2-3) | 2% |
| 5-BTB-O1 | (2-3) | 2% |
| 3-BTTB-O1 | (2-4) | 15% |
| 5-BTTB-O1 | (2-4) | 15% |
| 3-BB(F)TB-4 | (2-12) | 24% |
| 3-BB(F, F)XB(F)B(F, F)-F | (3-12) | 5% |
| 3-GB(F)B(F)B(F)-F | (3-10) | 5% |
| 3-GBB(F)B(F, F)-F | (3-11) | 2% |
| 4-GBB(F)B(F, F)-F | (3-11) | 2% |
| 2O-bt(7F)B(2F)B-3 | (2-19) | 3% |
| 2O-bt(7F)B(2F)B-4 | (2-19) | 4% |

NI=142.9° C.; Δn=0.40; Δε=10.9
The dielectric anisotropy and the tan δ of the liquid crystal composition 7 at 28 GHz were as follows.
Δε at 28 GHz=0.93
tan δ at 28 GHz=0.014

[Example 4] Liquid Crystal Composition 8

| | | |
|---|---|---|
| 5-B(F)TB(F)-TC | (1-1) | 15% |
| 2-BTB-O1 | (2-3) | 4% |
| 3-BTB-O1 | (2-3) | 3% |
| 4-BTB-O1 | (2-3) | 3% |
| 4-BTB-O2 | (2-3) | 3% |
| 5-BTB-O1 | (2-3) | 3% |
| 3-BTTB-O1 | (2-4) | 16% |
| 5-BTTB-O1 | (2-4) | 16% |
| 5-BTB(F)TB-2 | (2-13) | 10% |
| 5-BTB(F)TB-3 | (2-13) | 10% |
| 5-BTB(F)TB-3 | (2-13) | 5% |
| 3-BB(F, F)XB(F)B(F, F)-F | (3-12) | 12% |

NI=127.0° C.; Δn=0.41; Δε=10.3
The dielectric anisotropy and the tan δ of the liquid crystal composition 8 at 28 GHz were as follows.
Δε at 28 GHz=0.97
tan δ at 28 GHz=0.014

[Example 5] Liquid Crystal Composition 9

| | | |
|---|---|---|
| 5-BTB(F, F)-TC | (1-1) | 15% |
| 5-B(F)TB(Me)-TC | (1-1) | 10% |
| 5-BB(F)TB-TC | (1-2) | 5% |
| 3-BTTB-O1 | (2-4) | 15% |
| 5-BTTB-O1 | (2-4) | 15% |
| 3-BB(F)TB-4 | (2-12) | 24% |
| 2O-btTB-3 | (2-17) | 10% |
| 2O-bt(7F)B(2F)B-3 | (2-19) | 3% |
| 2O-bt(7F)B(2F)B-4 | (2-19) | 3% |

NI=143.2° C.; Δn=0.44; Δε=11.3

The dielectric anisotropy and the tan δ of the liquid crystal composition 9 at 28 GHz were as follows.
Δε at 28 GHz=1.00
tan δ at 28 GHz=0.013

[Example 6] Liquid Crystal Composition 10

| | | |
|---|---|---|
| 5-B (F) TB (F) -TC | (1-1) | 15% |
| 5-B(F)TB(F)-TC | (1-1) | 15% |
| 2-BTB-O1 | (2-3) | 2% |
| 3-BTB-O1 | (2-3) | 2% |
| 4-BTB-O1 | (2-3) | 2% |
| 4-BTB-O2 | (2-3) | 2% |
| 5-BTB-O1 | (2-3) | 2% |
| 3-BTTB-O1 | (2-4) | 15% |
| 5-BTTB-O1 | (2-4) | 15% |
| 3-BB(F)B-C | (3-20) | 10% |
| 3-BB(F)TB-4 | (2-12) | 15% |
| 2O-btTB-3 | (2-17) | 20% |

NI=129.7° C.; Δn=0.41; Δε=9.9

[Example 7] Liquid Crystal Composition 11

| | | |
|---|---|---|
| 5-B(F)TB(F)-TC | (1-1) | 15% |
| 5-BB(F)TB-TC | (1-2) | 5% |
| 2-BTB-O1 | (2-3) | 6% |
| 3-BTB-O1 | (2-3) | 6% |
| 4-BTB-O1 | (2-3) | 6% |
| 4-BTB-O2 | (2-3) | 6% |
| 5-BTB-O1 | (2-3) | 6% |
| 3-BTTB-O1 | (2-4) | 15% |
| 5-BTTB-O1 | (2-4) | 15% |
| 5-BTB(F)TB-2 | (2-13) | 10% |
| 5-BTB(F)TB-3 | (2-13) | 10% |

NI=124.8° C.; Δn=0.42; Δε=7.9

[Example 8] Liquid Crystal Composition 12

| | | |
|---|---|---|
| 5-B(F)TB(F)-TC | (1-1) | 15% |
| 5-B(Me)TB(F)-TC | (1-1) | 10% |
| 5-BB(F)TB-TC | (1-2) | 5% |
| 3-BTTB-O1 | (2-4) | 25% |
| 5-BTTB-O1 | (2-4) | 25% |
| 5-BTB(F)TB-2 | (2-13) | 10% |
| 5-BTB(F)TB-3 | (2-13) | 10% |

NI=144.7° C.; Δn=0.46; Δε=11.0

[Example 9] Liquid Crystal Composition 13

| | | |
|---|---|---|
| 5-B(F)TB(F)-TC | (1-1) | 10% |
| 5-B(Me)TB(F)-TC | (1-1) | 10% |
| 5-BB(F)TB-TC | (1-2) | 5% |
| 2-BTB-O1 | (2-3) | 2% |
| 3-BTB-O1 | (2-3) | 2% |
| 4-BTB-O1 | (2-3) | 2% |
| 4-BTB-O2 | (2-3) | 2% |
| 5-BTB-O1 | (2-3) | 2% |
| 3-BTTB-O1 | (2-4) | 15% |
| 5-BTTB-O1 | (2-4) | 15% |
| 2O-btTB-3 | (2-17) | 20% |
| 2O-bt(7F)B(2F)B-3 | (2-19) | 5% |
| 3-BB(F)B-C | (3-20) | 10% |

NI=130.9° C.; Δn=0.42; Δε=12.2

[Example 10] Liquid Crystal Composition 14

| | | |
|---|---|---|
| 5-B(F)TB(F)-TC | (1-1) | 10% |
| 5-B(Me)TB(F)-TC | (1-1) | 10% |
| 5-B(F)TB-TC | (1-1) | 5% |
| 5-BB(F)TB-TC | (1-2) | 5% |
| 2-BTB-O1 | (2-3) | 2% |
| 3-BTB-O1 | (2-3) | 2% |
| 4-BTB-O1 | (2-3) | 2% |
| 4-BTB-O2 | (2-3) | 2% |
| 5-BTB-O1 | (2-3) | 2% |
| 3-BTTB-O1 | (2-4) | 15% |
| 5-BTTB-O1 | (2-4) | 15% |
| 5-BTB(F)TB-3 | (2-13) | 10% |
| 2O-btTB-3 | (2-17) | 20% |

NI=126.4° C.; Δn=0.43; Δε=11.0

[Example 11] Liquid Crystal Composition 15

| | | |
|---|---|---|
| 5-B(F)TB(F)-TC | (1-1) | 15% |
| 5-B(Me)TB(F)-TC | (1-1) | 15% |
| 3-BTTB-O1 | (2-4) | 15% |
| 5-BTTB-O1 | (2-4) | 15% |
| 5-BTB(F)TB-2 | (2-13) | 10% |
| 5-BTB(F)TB-3 | (2-13) | 10% |
| 2O-btTB-3 | (2-17) | 20% |

NI=128.3° C.; Δn=0.44; Δε=12.3

[Example 12] Liquid Crystal Composition 16

| | | |
|---|---|---|
| 5-BTB(F, F)-TC | (1-1) | 15% |
| 5-B(F)TB(Me)-TC | (1-1) | 10% |
| 5-BB(F)TB-TC | (1-2) | 5% |
| 3-BTTB-O1 | (2-4) | 15% |
| 5-BTTB-O1 | (2-4) | 15% |
| 5-BTB(F)TB-2 | (2-13) | 9% |
| 5-BTB(F)TB-3 | (2-13) | 9% |
| 2O-btTB-3 | (2-17) | 22% |

NI=133.2° C.; Δn=0.46; Δε=11.8

The Δn of the compositions of Comparative Examples 1 to 4 was in a range of 0.23 to 0.37, and on the other hand, the Δn of the compositions of Examples 1 to 12 was in a range of 0.39 to 0.46. Because each example has a larger Δn, the Δε at 28 GHz is expected to be a larger value.

The Δε at 28 GHz of the compositions of Comparative Examples 1 to 4 was in a range of 0.54 to 0.85, and the tan δ at 28 GHz was in a range of 0.011 to 0.016. On the other hand, the Δε at 28 GHz of the compositions of Examples 1 to 5 was in a range of 0.91 to 1.00, and the tan δ at 28 GHz was in a range of 0.013 to 0.014.

Each of the compositions of Examples 1 to 12 contains the compound represented by Formula (1). As a constituent compound of the composition, the more the compound is contained, the greater the dielectric anisotropy at a high frequency. On the other hand, the values of the tan δ at 28 GHz were substantially the same.

Regarding the liquid crystal composition using the compound represented by Formula (1), the basic performance as a liquid crystal composition is kept, and (by increasing the refractive index anisotropy at 589 nm,) the Δε at 28 GHz can be relatively increased while the value of the tan δ at 28 GHz was maintained to be small.

In addition, the Δε of the compositions of Comparative Examples 1 to 4 at a low frequency (measured at 1 kHz) was in a range of 4.6 to 5.5, and on the other hand, the Δε of the compositions of Examples 1 to 7 was in a range of 6.9 to 12.3. By using the compound represented by Formula (1), the dielectric anisotropy at a low frequency can be improved while the phase control characteristics of a high electromagnetic wave signal were kept.

The value of Δn, the value of Δε at 28 GHz, and the value of Δε (measured at 1 kHz) of Examples 1 to 7 were respectively larger than those of Comparative Examples 1 to 4.

From this fact, in the liquid crystal composition using the compound represented by Formula (1), the dielectric anisotropy at a low frequency can be set large. This has the effect of reducing the drive voltage of the liquid crystal element. Besides, the dielectric anisotropy at a high frequency which is effective for the phase control of an electromagnetic wave signal can be set large. Thereby, the phase control of the electromagnetic wave signal can be performed more efficiently.

The liquid crystal composition of the disclosure appropriately adjusts the characteristics such as a high upper limit temperature of the nematic phase, a low lower limit temperature of the nematic phase, relatively low viscosity, and particularly, has large dielectric anisotropy and a small tan δ in a frequency region where the phase control of an electromagnetic wave signal is performed and large dielectric anisotropy at a low frequency. Therefore, in the element using this liquid crystal composition, the drive voltage is lower, and the phase of an electromagnetic wave signal can be controlled with high efficiency.

INDUSTRIAL APPLICABILITY

The liquid crystal composition of the disclosure satisfies at least one characteristic or has an appropriate balance for at least two characteristics in the characteristics such as a high upper limit temperature of the nematic phase, a low lower limit temperature of the nematic phase, low viscosity, large refractive index anisotropy, large dielectric anisotropy, and a small dielectric loss tangent (tan δ) in a frequency region where the phase control of an electromagnetic wave signal is performed, large dielectric anisotropy at a low frequency to reduce the drive voltage, and the like. The element containing this composition can be used for phase control of an electromagnetic wave signal having a frequency of 1 GHz to 10 THz.

What is claimed is:

1. A liquid crystal composition which is used in an element for phase control of an electromagnetic wave signal having any frequency from 1 GHz to 10 THz, the liquid crystal composition comprising at least one compound selected from compounds represented by Formula (1), and having a refractive index anisotropy of 0.30 to 0.80 at 25° C. at a wavelength of 589 nm,

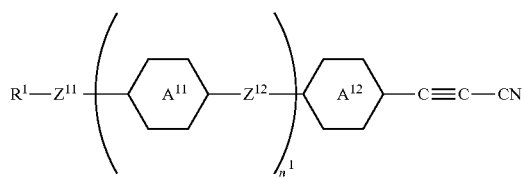

(1)

wherein in Formula (1), $R^1$ is alkyl having 1 to 12 carbon atoms, alkoxy having 1 to 12 carbon atoms, alkenyl having 2 to 12 carbon atoms, or alkenyloxy having 2 to 12 carbon atoms, non-adjacent —$CH_2$— in $R^1$ may be replaced by —S—, and hydrogen may be replaced by fluorine, ring $A^{11}$ is a group selected from a group consisting of Groups (A) and (B),

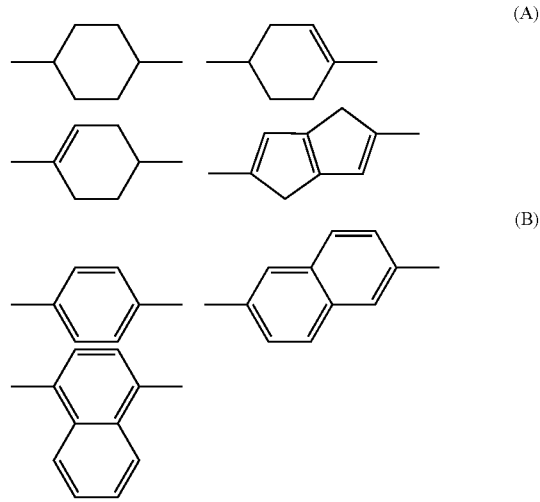

in groups of Group (A), non-adjacent —$CH_2$— may be replaced by —O— or —S—, in groups of Group (B), at least one —CH= may be replaced by —N=, and in groups of Groups (A) and (B), at least one hydrogen may be replaced by cyano, fluorine, alkyl having 1 to 5 carbon atoms, or cycloalkyl having 3 to 6 carbon atoms, ring $A^{12}$ is 1,4-phenylene, and at least one hydrogen may be replaced by cyano, fluorine, alkyl having 1 to 5 carbon atoms, or cycloalkyl having 3 to 6 carbon atoms, $Z^{11}$ is a single bond, —CH=CH—, or —C≡C— $Z^{12}$ is a single bond, —$CH_2CH_2$—, —CH=CH—, or —C≡C— one of $Z^{12}$ is —$CH_2CH_2$—, —CH=CH—, or —C≡C—, and multiple $Z^{12}$ may all be single bonds when hydrogen of $R^1$ is replaced by fluorine, when $Z^{11}$ is or when at least one hydrogen in the ring $A^{11}$ is replaced by cyano, alkyl having 1 to 5 carbon atoms, or cycloalkyl having 3 to 6 carbon atoms, and $n^1$ is 1, 2, or 3.

2. The liquid crystal composition according to claim 1, comprising at least one compound selected from compounds represented by Formulas (1-1) to (1 9),

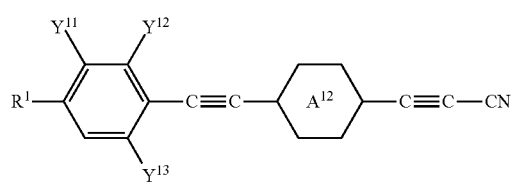

(1-1)

-continued (1-2)
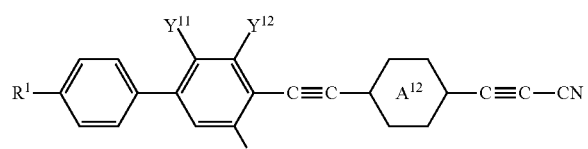

(1-3)
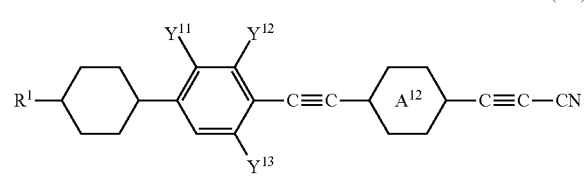

(1-4)
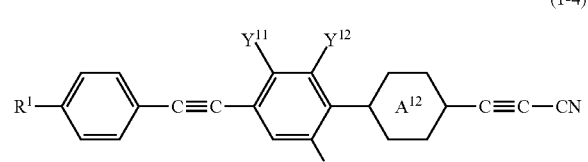

(1-5)
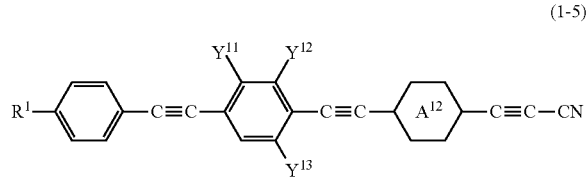

(1-6)
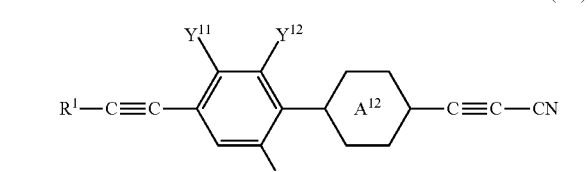

(1-7)
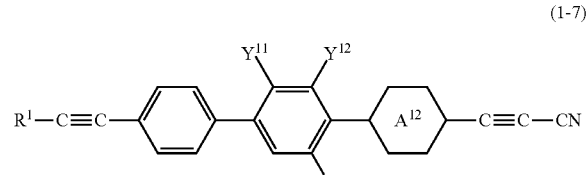

(1-8)

(1-9)
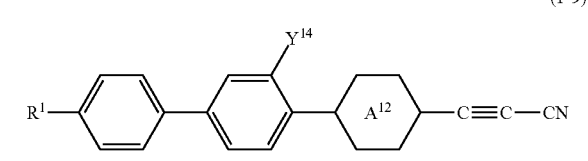

wherein in these formulas, $R^1$ is alkyl having 1 to 12 carbon atoms, alkoxy having 1 to 12 carbon atoms, alkenyl having 2 to 12 carbon atoms, or alkenyloxy having 2 to 12 carbon atoms, $Y^{11}$, $Y^{12}$, and $Y^{13}$ are hydrogen, fluorine, methyl, ethyl, or cycloalkyl having 3 to 6 carbon atoms, $Y^{14}$ is methyl, ethyl, or cycloalkyl having 3 to 6 carbon atoms, and ring $A^{12}$ is 1,4-phenylene, and at least one hydrogen may be replaced by fluorine or alkyl having 1 to 5 carbon atoms.

3. The liquid crystal composition according to claim 1, wherein a proportion of the compounds represented by Formula (1) is in a range of 5% by mass to 60% by mass based on a mass of the liquid crystal composition.

4. The liquid crystal composition according to claim 1, further comprising at least one compound selected from compounds represented by Formula (2) as a second component, (2)
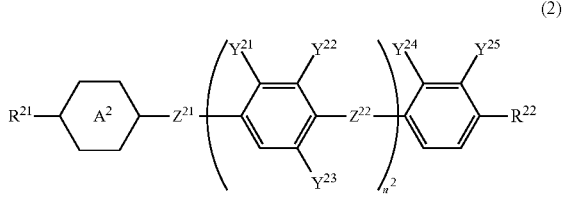

wherein in Formula (2), $R^{21}$ and $R^{22}$ are alkyl having 1 to 12 carbon atoms, alkoxy having 1 to 12 carbon atoms, or alkenyl having 2 to 12 carbon atoms, and non-adjacent —$CH_2$— in $R^{21}$ and $R^{22}$ may be replaced by —O—, —CO—, —COO—, —CH=CH—, —C≡C—, or —S—, but O atoms are not directly bonded to each other;

ring $A^2$ is 1,4-cyclohexylene, 1,4-phenylene, 2-fluoro-1,4-phenylene, difluoro-1,4-phenylene, 2,6-difluoro-1,4-phenylene, 2,6-benzothiophene, or 7-fluoro-2,6-benzothiophene;

$Z^{21}$ and $Z^{22}$ are single bonds, —$CH_2CH_2$—, —CH=CH—, —C≡C—, —COO—, or —C≡C—C≡C—;

$Y^{21}$ and $Y^{22}$ are hydrogen, fluorine, alkyl having 1 to 5 carbon atoms, or cycloalkyl having 3 to 6 carbon atoms, and $Y^{23}$, $Y^{24}$, and $Y^{25}$ are hydrogen or fluorine, but $Y^{24}$ and $Y^{25}$ are not fluorine at the same time; and $n^2$ is 0, 1, or 2.

5. The liquid crystal composition according to claim 4, comprising at least one compound selected from a group of compounds represented by Formulas (2-1) to (2-21), (2-1)
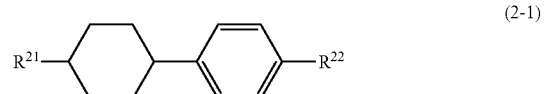

(2-2)
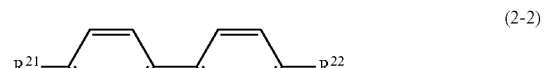

(2-3)
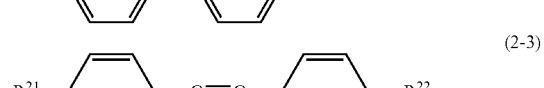

(2-4)
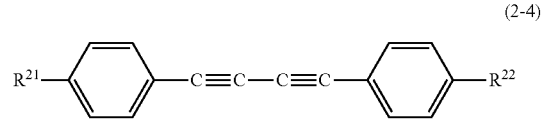

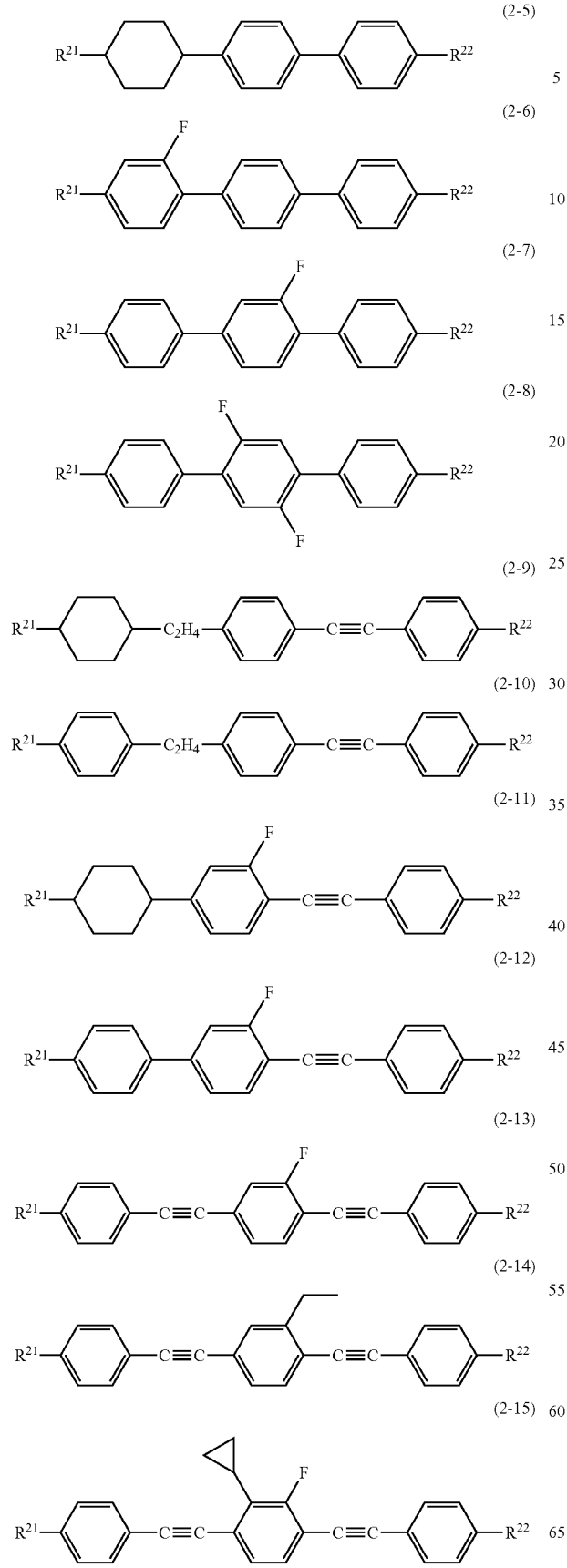

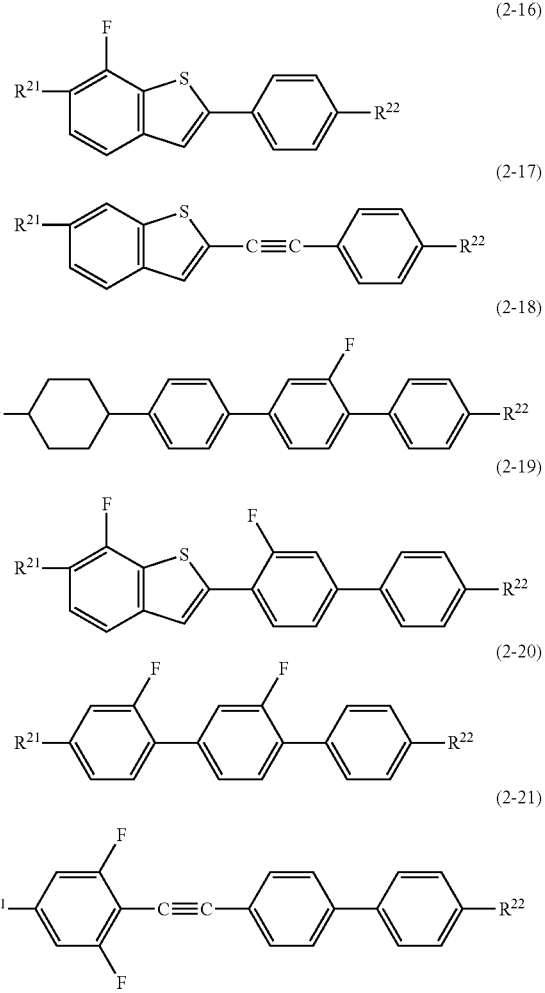

wherein in these formulas, $R^{21}$ and $R^{22}$ are alkyl having 1 to 12 carbon atoms, alkoxy having 1 to 12 carbon atoms, or alkenyl having 2 to 12 carbon atoms, and non-adjacent —$CH_2$— in $R^{21}$ and $R^{22}$ may be replaced by —O—, —CO—, —COO—, —CH═CH—, or —C≡C—but O atoms are not directly bonded to each other.

6. The liquid crystal composition according to claim 4, wherein a proportion of the compounds represented by Formula (2) is in a range of 40% by mass to 90% by mass.

7. The liquid crystal composition according to claim 1, comprising at least one compound selected from compounds represented by Formula (3),

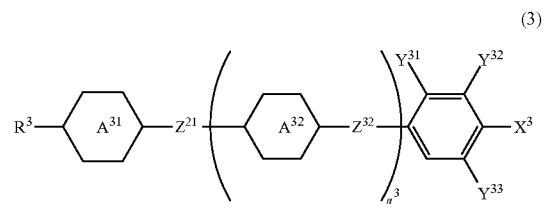

wherein in Formula (3),
$R^3$ is alkyl having 1 to 12 carbon atoms, alkoxy having 1 to 12 carbon atoms, or alkenyl having 2 to 12 carbon atoms, and non-adjacent —CH$_2$— in R$^3$ may be replaced by —O—, —CO—, —COO—, —CH=CH—, —C≡C—, or —S—, but O atoms are not directly bonded to each other, and hydrogen may be replaced by fluorine;

ring A$^{31}$ is 1,4-cyclohexylene, 1,4-phenylene, 2-fluoro-1,4-phenylene, 2,5-difluoro-1,4-phenylene, 2,6-difluoro-1,4-phenylene, pyridine-2,5-diyl, pyrimidine-2,5-diyl, 1,3-dioxane-2,5-diyl, or tetrahydropyran-2,5-diyl;

ring A$^{32}$ is 1,4-phenylene, 2-fluoro-1,4-phenylene, 2,5-difluoro-1,4-phenylene, 2,6-difluoro-1,4-phenylene, pyridine-2,5-diyl, or pyrimidine-2,5-diyl;

Z$^{31}$ and Z$^{32}$ are single bonds, —CH$_2$CH$_2$—, —CH=CH—, —C≡C—, —COO—, or —CF$_2$O—;

X$^3$ is —F, —Cl, —CF$_3$, —OCF$_3$, —C≡C—CF$_3$, —C≡C—OCF$_3$, —CN, or —NCS;

Y$^{31}$, Y$^{32}$, and Y$^{33}$ are hydrogen or fluorine, but Y$^{31}$ and Y$^{32}$ are not fluorine at the same time; and n$^3$ is 1, 2, or 3.

8. The liquid crystal composition according to claim 7, comprising at least one compound selected from a group of compounds represented by formulas (3-1) to (3-28), (3-1)

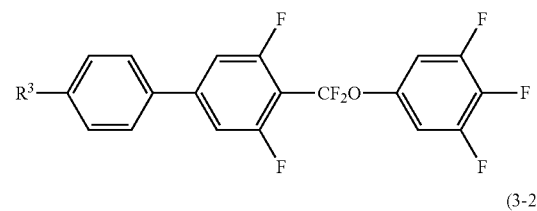

(3-2)

(3-3)

(3-4)

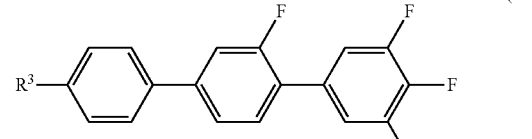

(3-5)

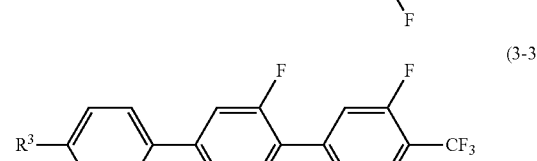

-continued (3-6)

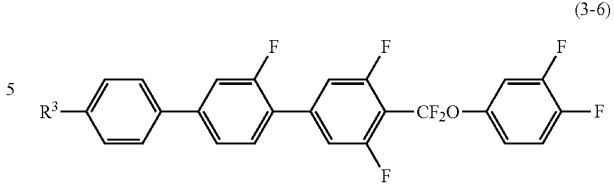

(3-7)

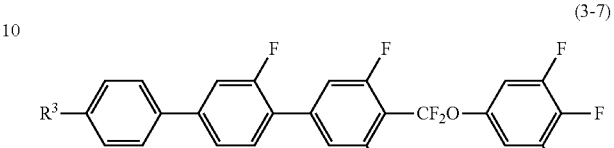

(3-8)

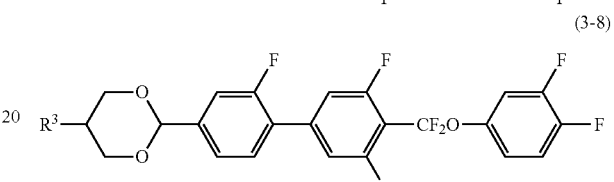

(3-9)

(3-10)

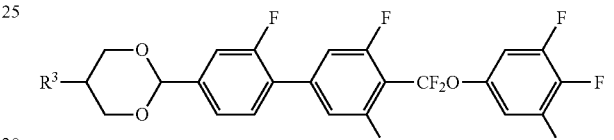

(3-11)

(3-12)

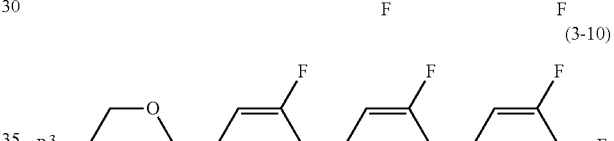

(3-13)

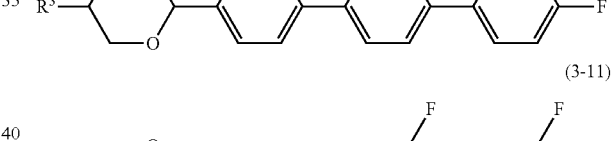

(3-14)

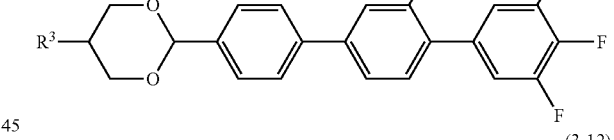

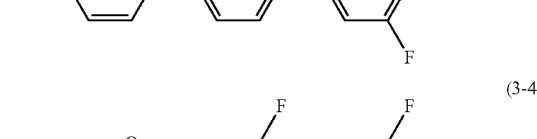
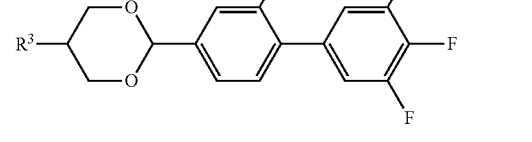
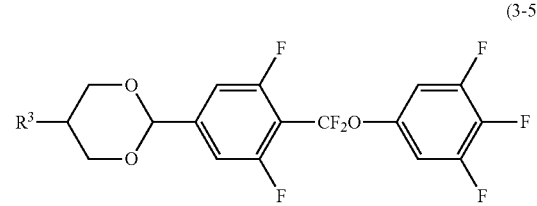
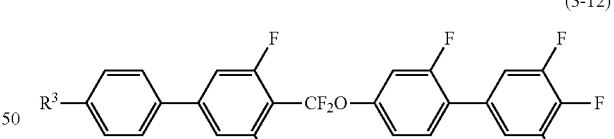

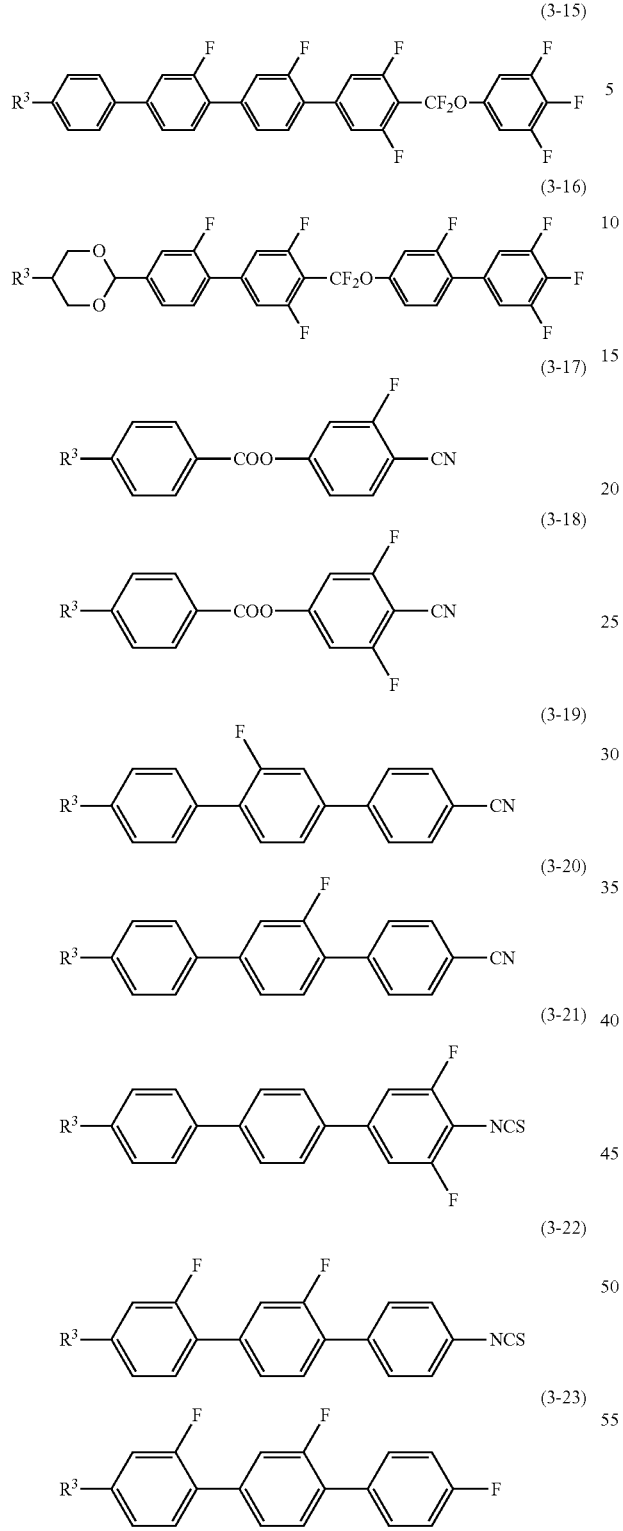
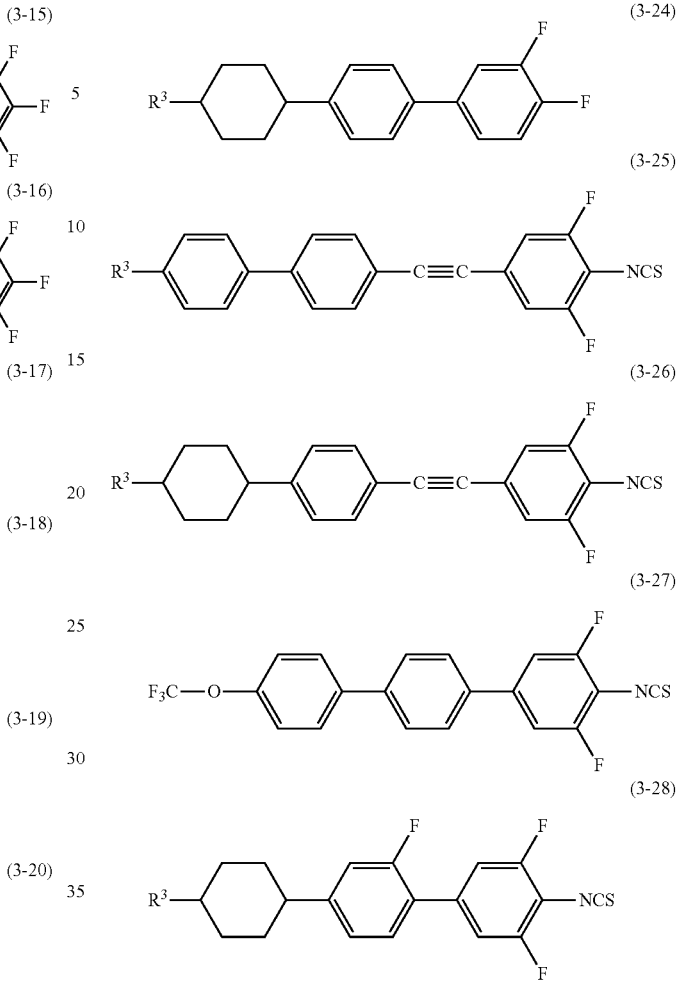

wherein in these formulas, $R^3$ is alkyl having 1 to 12 carbon atoms, alkoxy having 1 to 12 carbon atoms, or alkenyl having 2 to 12 carbon atoms, and non-adjacent —CH$_2$— in $R^3$ may be replaced by —O—, —CO—, —COO—, —CH=CH—, or —C≡C—, but O atoms are not directly bonded to each other.

9. The liquid crystal composition according to claim 7, wherein a proportion of the compounds represented by Formula (3) is in a range of 5% by mass to 30% by mass.

10. The liquid crystal composition according to claim 1, wherein dielectric anisotropy at 25° C. at any frequency from 1 GHz to 10 THz is in a range of 0.40 to 2.0.

11. The liquid crystal composition according to claim 1, comprising an optically active compound.

12. The liquid crystal composition according to claim 1, comprising a polymerizable compound.

13. An element which is used for phase control of an electromagnetic wave signal having any frequency from 1 GHz to 10 THz, the element comprising the liquid crystal composition according to claim 1.

* * * * *